US012415675B2

(12) United States Patent
Matuschek

(10) Patent No.: US 12,415,675 B2
(45) Date of Patent: Sep. 16, 2025

(54) LOCK, IN PARTICULAR RUBBISH BIN LOCK

(71) Applicant: S. Franzen Söhne GmbH, Langenfeld (DE)

(72) Inventor: Manfred Matuschek, Solingen (DE)

(73) Assignee: S. Franzen Söhne GmbH, Langenfeld (DE)

( * ) Notice: Subject to any disclaimer, the term of this patent is extended or adjusted under 35 U.S.C. 154(b) by 0 days.

(21) Appl. No.: 18/710,669

(22) PCT Filed: Nov. 22, 2022

(86) PCT No.: PCT/EP2022/082814
§ 371 (c)(1),
(2) Date: May 16, 2024

(87) PCT Pub. No.: WO2023/094380
PCT Pub. Date: Jun. 1, 2023

(65) Prior Publication Data
US 2025/0011077 A1 Jan. 9, 2025

(30) Foreign Application Priority Data
Nov. 23, 2021 (DE) .................... 10 2021 130 660.4

(51) Int. Cl.
*B65F 1/16* (2006.01)
*E05B 15/00* (2006.01)

(52) U.S. Cl.
CPC ........ *B65F 1/1615* (2013.01); *E05B 15/0093* (2013.01)

(58) Field of Classification Search
CPC .......................... B65F 1/1615; E05B 15/0093
(Continued)

(56) References Cited

U.S. PATENT DOCUMENTS

2008/0129057 A1* 6/2008 Talbot .................... E05C 19/10 292/99
2008/0271503 A1 11/2008 Buschmann
(Continued)

FOREIGN PATENT DOCUMENTS

DE 40 33 271 C2 11/1997
DE 199 30 339 A1 1/2001
(Continued)

OTHER PUBLICATIONS

International Search Report in PCT/EP2022/082814, mailed Jul. 18, 2023.

*Primary Examiner* — Jacob K Ackun
(74) *Attorney, Agent, or Firm* — Collard & Roe, P.C.

(57) ABSTRACT

A lock has a rotary latch held in a closed position by a pawl, that can be displaced into a release position in which the rotary latch can rotate into an open position. The lock has a storage element which, when the pawl is displaced into the release position, is displaced from a rest position into a storage position in which the pawl is blocked from being displaced back into its locking position and which, when the rotary latch is displaced back into the closed position, is displaced back into the rest position. The storage element has a projection which, in the locking position, is supported on a shoulder of the pawl, and which, in the storage position, rests against a flank of the pawl, and which is acted upon by the rotary latch when the rotary latch is displaced back.

20 Claims, 25 Drawing Sheets

(58) Field of Classification Search
USPC ....... 220/315, 908; 292/341.14, 341.17, 230, 292/234
See application file for complete search history.

(56) References Cited

U.S. PATENT DOCUMENTS

| | | | |
|---|---|---|---|
| 2014/0292000 | A1 | 10/2014 | Vazquez et al. |
| 2016/0200509 | A1* | 7/2016 | Matuschek ............. E05B 65/52 292/242 |
| 2018/0223568 | A1 | 8/2018 | Cho et al. |
| 2019/0382195 | A1* | 12/2019 | Jones ...................... B65F 1/004 |
| 2022/0267088 | A1* | 8/2022 | Patel ...................... B65F 1/1615 |
| 2023/0010597 | A1* | 1/2023 | Foster ...................... B65F 1/02 |
| 2024/0367898 | A1* | 11/2024 | Singh ................. G07C 9/00896 |
| 2025/0011076 | A1* | 1/2025 | Cox ...................... B65F 1/1623 |

FOREIGN PATENT DOCUMENTS

| | | | |
|---|---|---|---|
| DE | 10 2004 011 798 | B3 | 10/2005 |
| DE | 10 2007 039 351 | A1 | 11/2008 |
| DE | 10 2015 100 405 | A1 | 7/2016 |
| DE | 10 2016 115 400 | A1 | 2/2017 |
| DE | 10 2005 015 515 | B4 | 12/2017 |
| DE | 10 2018 120 435 | A1 | 2/2020 |
| DE | 10 2018 124 122 | A1 | 4/2020 |
| EP | 1 256 676 | B1 | 10/2006 |
| WO | 2005/093195 | A2 | 10/2005 |

* cited by examiner

LOCK, IN PARTICULAR RUBBISH BIN LOCK

CROSS REFERENCE TO RELATED APPLICATIONS

This application is the National Stage of PCT/EP2022/082814 filed on Nov. 22, 2022, which claims priority under 35 U.S.C. § 119 of German Application No. 10 2021 130 660.4 filed on Nov. 23, 2021, the disclosure of which is incorporated by reference. The international application under PCT article 21 (2) was not published in English.

TECHNICAL FIELD

The invention pertains to a lock, in particular a rubbish bin lock, with a rotary latch that is held in a closed position by a pawl in its locking position, wherein the pawl can be displaced into a release position, in which the rotary latch can rotate into an open position, by actuating a trigger, and with a storage element that is displaced from a rest position into a storage position, in which the pawl is blocked from being displaced back into its locking position, when the pawl is displaced into the release position and displaced back into the rest position when the rotary latch is displaced back from the open position into the closed position.

PRIOR ART

In a rotary latch lock, a rotary latch having a forked mouth is held in a closed position by a pawl. The rotary latch usually is mounted in a housing and displaceable from a closed position into an open position about a rotational axis. A closing element is in a catch position in the forked mouth in the closed position. The closing element can only leave the forked mouth of the rotary latch in the open position. The pawl usually is pivoted by a trigger, wherein the pawl is in the process displaced from a locking position, in which a supporting shoulder of the rotary latch is supported on a locking shoulder of the pawl such that the rotary latch is blocked from rotating, into a release position, in which the locking shoulder leaves its locking position such that the rotary latch can rotate into the open position and the closing element is released. The pawl usually pivots back into its locking position once the trigger is no longer actuated.

In certain applications of known rotary latch locks, it should be ensured that the rotary latch also can pivot from the closed position into the open position when the trigger is no longer actuated. To this end, the prior art proposes storage elements that also hold the pawl in the release position after the actuation of the trigger is terminated.

A rotary latch lock of this type is disclosed in DE 10 2005 015 515 B4, wherein the storage element is formed by a leaf spring that is capable of holding the storage element in a storage position. The leaf spring is once again moved into its rest position during the displacement of the rotary latch from the open position back into the closed position. However, the leaf spring only reaches its storage position after an initial rotation of the rotary latch in this case.

DE 4033271 C2 discloses a rotary latch lock with a trigger that acts against a triggering arm of a pawl in order to move the pawl into a release position. A storage lever has a step that can engage underneath the trigger in its triggering position in order to thereby prevent the pawl from immediately pivoting back into its locking position. The storage lever has a cam that interacts with the rotary latch such that the storage lever can be pivoted back into a rest position, in which the trigger can also pivot back into its starting position again, during a rotational movement of the rotary latch. The trigger is prevented from carrying out a backward displacement in this case.

The relevant prior art furthermore includes DE 199 30 339 A1 and EP 1 256 676 B1.

SUMMARY OF THE INVENTION

The invention is based on the objective of enhancing a generic lock advantageously with respect to the storage function and, in particular, of enhancing said lock in such a way that it can be used as a rubbish bin lock, in which the trigger is triggered by a weight that is displaced when the lock is tilted.

This objective is attained with the invention disclosed in the claims, wherein the dependent claims not only represent enhancements of the two coordinate claims, but rather also independent solutions to the objective.

According to a first aspect of the invention, it is proposed that the storage element is realized in the form of a slide or a pivoting element as it is basically known from the prior art, but that a projection additionally engages on a shoulder of the pawl in the rest position such that the storage element directly interacts with the pawl. The projection can perform a double function in that it rests on a flank of the pawl in the storage position and thereby prevents a displacement of the pawl. The flank and the shoulder may directly border on one another, e.g. by forming an edge. To this end, it is advantageous if the shoulder extends around the pivoting axis of the pawl along a circular arc line, which results in the storage element not having to be displaced during the displacement of the pawl from the locking position into the release position. The rotary latch may form a control shoulder that engages on a supporting shoulder of the storage element during the displacement of the rotary latch in order to once again displace the storage element back into the rest position either during the displacement of the rotary latch from the open position into the closed position or during the displacement of the rotary latch from the closed position into the open position. It is furthermore proposed that a locking shoulder of the pawl engages underneath a supporting shoulder of the rotary latch in the closed position. In addition, a control shoulder of the rotary latch may in the closed position of the rotary latch be spaced apart from a supporting shoulder of the storage element in such a way that, after the displacement of the pawl into its release position, a storage element spring displaces the storage element from the closed position into the storage position without prior displacement of the rotary latch. This is particularly advantageous when the lid of the rubbish bin, on which the lock is used, is not opened immediately after the displacement of the pawl from the locking position into the release position. The pawl is stored in the release position without requiring a rotation of the rotary latch. The storage element only leaves the storage position when the rotary latch rotates. It is likewise advantageous that the pawl is held in the release position without the cooperation of the trigger. To this end, it is advantageous that the pawl is directly supported on the storage element, particularly in a contacting manner, or that the storage element directly rests on the pawl, particularly in a contacting manner. It is furthermore advantageous that the storage element is in the rest position directly supported on the pawl and rests on the pawl, particularly in a contacting manner.

According to another aspect of the invention, it is proposed that the storage element has a sliding flank, along which a control flank of the rotary latch slides during its displacement from the closed position into the open position. According to another aspect of the invention, which can also be combined with the technical characteristics of the first aspect, it is proposed that the storage element is a slide that is guided in a guide.

According to another aspect of the invention, which can be combined with the technical characteristics of the above-described aspects, the projection may be supported on a shoulder of the pawl, which coincides with the locking shoulder, in the locking position. The projection may rest on a flank of the pawl in a hook-like manner in the storage position. In a manner of speaking, it overlaps a corner region of the pawl such that the pawl cannot pivot back into the locking position and the storage element cannot be displaced further. During the backward displacement of the rotary latch, the projection is acted upon by the rotary latch in order to once again allow its backward displacement.

Advantageous enhancements of the invention, which enhance an inventive lock or a lock according to the prior art individually and in combination, are described below: the storage element, which preferably is realized in the form of a slide, may be displaced from the rest position into the storage position by a storage element spring. The storage element spring may be supported on a section of a guide that guides the storage element. The storage element spring is pretensioned and may act against an end face of the storage element. The end face may lie opposite of a supporting shoulder, by means of which the storage element can be supported on a shoulder, particularly the locking shoulder of the pawl, in a rest position. The guide, in which the storage element is guided, may be formed by at least one guide rib that is fixed to the housing. It is preferred that the guide is formed by two sections of a guide rib or by two guide ribs, between which a guide groove extends. The storage element may lie in the guide groove in such a way that it essentially can be displaced linearly within the guide groove, but optionally also be slightly pivoted. The storage element therefore may lie in the guide groove with a pivoting clearance. The guide groove may have a section, on which the storage element spring is supported, wherein the storage element spring may be realized in the form of a pressure spring. The storage element spring may lie in the guide groove. According to another aspect of the invention, the storage element may form a control flank. The control flank may be formed by a control arm. The control flank makes it possible to force the storage element to carry out a pivoting movement during its displacement. To this end, the housing may have a guide projection. The forced pivoting movement preferably takes place during the displacement of the storage element from the storage position back into the rest position. This pivoting movement particularly takes place in order to displace a contact flank of the storage element on locking shoulder of the pawl. The storage element can be displaced, particularly pivoted, during the displacement of the rotary latch from the closed position into the open position. This takes place in the course of a sliding movement of the control flank of a rotary latch on the sliding flank of the storage element. The storage element may form an interlocked position with the pawl in the storage position. As a result of this interlocked position, the pawl is also pivoted in the course of the sliding movement of the control flank on the sliding flank. The storage element may have a projection that forms a supporting shoulder supported on the pawl. The supporting shoulder preferably is supported on a shoulder of the pawl. The shoulder may be the same locking shoulder that holds the rotary latch in its closed position in the locking position of the pawl. The storage element may form two supporting shoulders that are arranged offset to one another. The offset of the two supporting shoulders makes it possible to form a contact flank that is supported on the pawl in the storage position. The projection may then lie in front of a flank of the pawl, along which the control flank of the rotary latch can also slide when the rotary latch rotates into the open position. During the displacement of the storage element from the rest position into the storage position, the locking shoulder of the pawl initially can slide along a first supporting shoulder of the projection of the storage element in order to subsequently move against the second supporting shoulder, which is offset thereto and holds the storage element in the storage position, after a displacement of the storage element in the guide. A control arm of the rotary latch may slide along the sliding flank of the storage element in the storage position and in the process slightly pivot the storage element. The control arm of the rotary latch runs over the projection of the storage element. The control arm may have completely run over the storage element in the open position. It is particularly proposed that the projection or the supporting shoulder of the storage element lies in the path of movement of a control shoulder of the storage element in the open position of the rotary latch such that the storage element is dragged along by the control arm during a backward displacement of the rotary latch. The supporting shoulder of the storage element, which is acted upon by the control shoulder of the rotary latch, is in the process displaced to such a degree that the locking shoulder of the pawl can move underneath the supporting shoulder in order to thereby once again hold the storage element in the rest position. The control flank, which particularly is formed by a control arm, can assist the supporting shoulder of the storage element in running over the locking shoulder of the pawl. This is particularly advantageous if the control flank of the rotary latch is supported on a flank of the pawl during the rotation of the rotary latch such that the pawl can only pivoted during the backward displacement of the rotary latch into the closed position once the supporting shoulder of the rotary latch has run over the locking shoulder of the pawl. A pretensioned pawl spring can then pivot the pawl into the locking position. The storage element may have an end face that is subjected to pressure by the storage element spring. The horizontal projection of the storage element may be widened in the region of this end face. At this location, the storage element particularly may form two laterally protruding wings that can be supported on the facing walls of the guide rib with slight movement clearance. This widened section of the storage element therefore forms the pivoting axis, about which the arm that ends with the projection and is formed by the storage element can be slightly pivoted. The pivotability of the thusly performed arm is limited by the distance between the two facing walls of the guide ribs. The pivoting angle suffices for moving the projection into its interlocked position. The rotary latch may be acted upon in the direction of its open position by a rotary latch spring. The trigger may be moved into a triggering position by a triggering slide or a rotatable cam. The rotatable cam may be seated on a closing cylinder such that the lock can be actuated by a closing cylinder. The lock in the form of a rubbish bin lock may have a weight that can be displaced within the housing of the lock when the lock is tilted or when a rubbish bin equipped with the lock is tilted, respectively. The displacement of the weight leads to a displacement of the pawl from its locking position into its release position. The displacement of the weight may only cause the pawl to be pivoted to such a degree that the sliding flank of the storage element extends flush with the flank of the pawl, but the storage element is still supported on the locking shoulder of the pawl with a supporting shoulder, such that the storage element remains in its rest position and is not displaced into the storage position during this actuation. The invention therefore also pertains to a lock, in which triggering of the pawl takes place in such a way that the storage element remains in the rest position after the release of the rotational movement of the rotary latch from the closed position into the open position.

According to a variation of the inventive lock, it is proposed that the storage element is a slide that has a control shoulder, wherein said control shoulder is acted upon by a control shoulder of the rotary latch during the displacement of the rotary latch from its closed position into its open position in order to displace the storage element from its storage position back into the rest position. The storage element can interlock in a recess of a triggering arm of the pawl in the rest position. One wall of the recess may form a stop, on which the pawl can be supported in its locking position. Another wall of the recess may form a shoulder that extends around the pivoting axis of the pawl along a circular arc line or along a differently designed curve, e.g. a straight line. The storage element can be held in the rest position with this shoulder. It is acted upon against this shoulder by the storage element spring. A locking shoulder of the pawl, which engages underneath a supporting shoulder of the rotary latch in the locking position, may likewise extend around the pivoting axis of the pawl along a circular arc line. The rotary latch initially does not have to rotate when the pawl is displaced from the locking position into the release position due to a displacement of a trigger into a triggering position, e.g. by actuating a trigger or displacing a triggering slide or by rotating a rotatable cam or by a weight being displaced due to tilting of the lock. The projection leaves the recess due to the pivoting movement of the pawl into the release position such that the storage element can be displaced into the storage position by the storage element spring. The projection rests on a flank of the pawl in this storage position. The projection lies in the rotational range of this flank such that the pawl being acted upon by a pawl spring cannot be displaced out of the release position. The trigger can leave the triggering position without losing the storage function of the storage element. The pawl initially also remains held in the release position once the trigger has left its triggering position.

According to another aspect of the invention, the rotary latch has sealing surfaces that extend along a circular arc line. The sealing surfaces are formed by sort of a hub of the rotary latch, wherein the fork tines forming the forked mouth on the one hand and a control arm on the other hand protrude from said hub. Sealing elements that are connected to inner housing walls abut on these sealing surfaces that extend on the outer surface of a circular cylinder. This makes it possible to prevent the admission of external moisture into the housing, in which the pawl and the storage element are mounted. The housing may consist of two housing parts, e.g. two housing shells or one housing shell and one housing cover. The housing forms outer housing walls, which form a housing cavity that is surrounded by walls together with the inner housing walls. The pawl, the storage element, one or more triggers, a weight and other elements for actuating the lock may be arranged in the housing cavity. Furthermore, a control arm of the rotary latch also protrudes into the housing cavity. The hub of the rotary latch may lie in an opening of the inner housing walls such that the forked mouth protrudes from the housing cavity into the catcher through the opening. The sealing elements are made of an elastic material and connect the edges of the opening of the inner housing walls to the hub of the rotary latch in a sealing manner.

The invention furthermore pertains to an enhancement of a rubbish bin lock that has a housing with a latch arranged therein, wherein said latch is held in a closed position in an upright position of the lock, and wherein said rubbish bin lock has a weight that is displaced from a rest position into a triggering position and thereby releases the latch for a displacement into the open position when the lock is tilted from an upright position into an inverted position of the lock. In the upright position, the lock holds a lid of the rubbish bin, on which the lock is fastened, in a closed position, in which the lid can only be opened by another opening actuation of the lock, e.g. of the type described above. However, such a lock ensures that the latch, which holds a counter closing part fastened on the lid, is displaced into an open position, in which the counter closing part is released such that the lid can pivot into an open position, when the rubbish bin is emptied by transferring the rubbish bin with the lock fastened thereon into an inverted position.

A lock of this type is known, in particular, from DE 10 2015 100 405 A1.

It is furthermore known to arrange locking elements within a lock housing, wherein said locking elements are realized in the form of pendulums or in the form of rolling bodies mounted in troughs and displaced into a locking position, in which the weight cannot be displaced from the rest position into a triggering position, when the lock housing is tilted about an axis other than the axis, about which the lid opens. This makes it possible to ensure that the lid is only released for being opened when the rubbish bin is tilted about the permissible tilting axis. However, this does not prevent the lid from being released when the rubbish bin is in fact tilted in the correct direction, but not as far as the inverted position, wherein this can occur when the rubbish bin is knocked over about this axis.

The invention is based on the objective of enhancing the above-described rubbish bin lock advantageously with respect to its use and, in particular, of taking measures that prevent the lid from being released for being opened when the rubbish bin is knocked over.

This objective is attained with the invention disclosed in the claims. It is initially and essentially proposed that the housing has one or more locking elements. The weight may have inhibition elements that are functionally assigned to the locking elements. The locking elements d the inhibition elements are arranged and designed in such a way that they prevent a displacement of the weight from the rest position into the triggering position when the rubbish bin is not sufficiently tilted as far as the inverted position. A gravitationally induced tilting movement of the weight particularly causes the inhibition element to move against a locking element. However, it is also proposed that the inhibition element is moved into an active position as a result of applying an angular momentum to the lock or to the rubbish bin equipped with the lock, respectively. The inhibition element can be supported on the locking element fixed on the housing in this active position. The inhibition element or the locking element respectively may be an inclined flank or have a rounding. The inclined flank may be designed in such a way that, during the tilting movement of the lock from the upright position into an intermediate tilting position, it is moved from a position, in which it ascends relative to a horizontal plane, into a horizontal position relative to a sliding surface, along which the weight slides. When the lock is additionally pivoted from the intermediate tilting position into the inverted position, the inclined flank assumes a position, in which it descends relative to the horizontal plane, such that a front edge of an extension of the weight can be supported on a thusly designed locking step. A locking step may border on the sliding flank such that an angle greater than 100 degrees is formed. The weight may have two surfaces that extend obliquely to one another and selectively can rest on the sliding surface and slide along the sliding surface. The two surfaces border on one another at a bending line that forms a tilting axis, about which the weight can tilt. The weight can tilt about this tilting axis from a rest position, in which, for example, a front edge forming an inhibition element is spaced apart from a locking step forming a locking element, into a tilting position, in which the locking step lies in the path of movement of the front edge. Alternative or additional locking elements and inhibition elements may be provided. The locking above-described elements and inhibition elements become active when the weight is tilted about a tilting axis lying in a broadside surface whereas the alternative or additional inhibition elements may become active when the weight is tilted about one of its two narrow sides. In this case, the tilting movement of the weight also may be caused either by gravity or an angular momentum. The housing may have locking lugs that protrude, for example, from a sidewall of a guide track that also forms the sliding surface. Tilting supports, which may be formed by projections and about which the weight can tilt, may also protrude from this sidewall. To this end, a narrow sidewall of the weight moves against one of the tilting projections during a tilting movement of the lock. The accompanying tilting movement of the weight causes a catch recess designed in the form of an inhibition element or a projection designed in the form of an inhibition element to lie in front of a locking lug designed in the form of a locking element such that the displacement of the weight is inhibited. The locking lug, the projection or a flank of the recess may extend obliquely to the direction of displacement of the weight such that a disinhibition takes place when the lock is pivoted in the direction of the inverted position beyond the intermediate pivoting position and the weight can then slide into the triggering position.

BRIEF DESCRIPTION OF THE DRAWINGS

Exemplary embodiments of the invention are described below with reference to the attached drawings. In these drawings.

DESCRIPTION OF THE EMBODIMENTS

Figure 9:
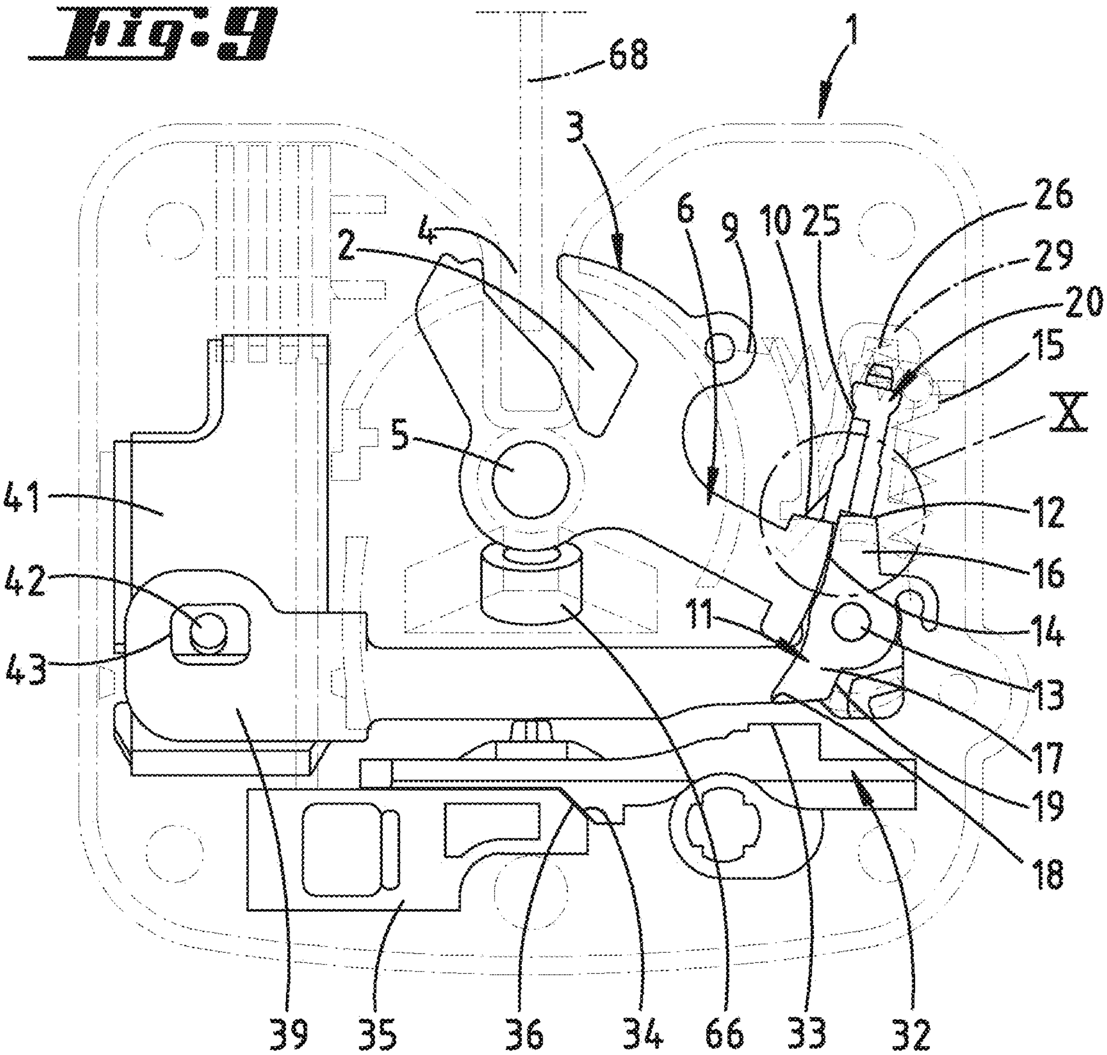
FIG. 9 shows a follow-up view to FIG. 8, in which a control shoulder 10 of the control arm 6 of the rotary latch 3 has acted upon the storage element 20.

The lock illustrated in the drawings can be fastened on a rubbish bin in the form of a rubbish bin lock. The lock particularly is fastened on an upwardly open container in the region of an edge of the opening. The rubbish bin lock may have a hinged lid that can be pivoted about a pivoting axis in order to load and to empty the rubbish bin. The hinged lid can be locked by means of the lock. To this end, the hinged lid may have a locking element, e.g. a striker, which can engage into a catcher 2 of the lock housing 1. When a rotary latch 3, which is mounted in the lock housing 1 so as to be rotatable about a rotational axis 5, is in an open position (FIG. 9), the locking element can engage into the forked mouth 4 of the rotary latch 3 and in the process displace the rotary latch 3 into a closed position (FIG. 1) against the restoring force of a rotary latch spring 9, which is realized in the form of a tension spring. In the closed position, a supporting shoulder 7 arranged on a control arm 6 of the rotary latch 3 is supported by a locking shoulder 12 of a pawl 11 that is pivotable about a pivoting axis 13 such that the rotary latch 3 is constrained in the closed position.

A triggering slide 35 is located in the lock housing 1 and has a bevel 36 that interacts with a bevel 34 of a trigger 32. When the trigger 32 is displaced, e.g. by displacing the triggering slide 35 in that, for example, a finger engages into a recessed grip 52 through an opening 51 in a rear wall 50, a triggering flank 33 moves against a triggering flank 18, which is formed by a triggering arm 17 of the pawl 11, in order to move the pawl 11 into a release position.

However, the trigger 32 can also be displaced by a cam 38 of a closing cylinder 37. The eccentric cam 38 engages on the trigger 32 during the rotation of the closing cylinder 37 in order to move the triggering flank 33 against the triggering flank 18.

The pawl 11 furthermore can be moved into a release position due to a displacement of a weight 41 that is guided in a guide 44 of the housing 1. To this end, a triggering lever 39 having a projection 40 is pivoted, wherein said projection moves against another triggering flank 19 of the triggering arm 17 of the pawl 11. The triggering lever 39 may be mounted so as to be rotatable about the pivoting axis 13 of the pawl 11. A pin 42 fastened on the weight 41 can engage into an eye 43 of the triggering lever 39. In the exemplary embodiment, the weight 41 carries out a linear displacement when the lock is tilted.

Figure 1:
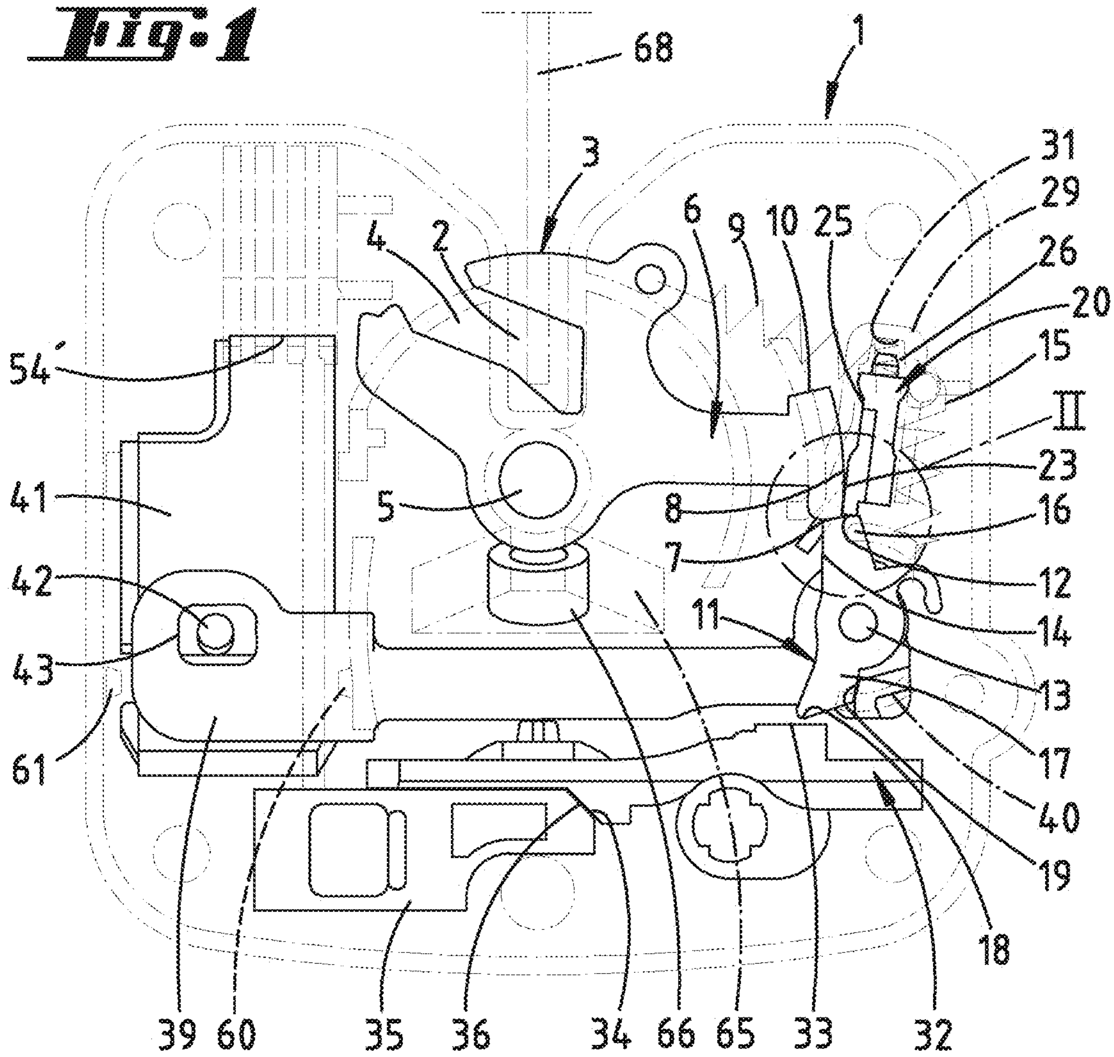
FIG. 1 shows a first exemplary embodiment of a rubbish bin lock with removed lock cover such that the relevant components of the lock and their functions are visible, wherein the rotary latch 3 assumes a closed position and a pawl 11 holding the rotary latch 3 assumes a locking position.

In the locking position illustrated in FIG. 1, the supporting shoulder 7 of the control arm 6 of the rotary latch 3 is supported on a locking shoulder 12 of the pawl 11. Furthermore, a supporting shoulder 21' of storage element 20 is supported on the same locking shoulder 12. The supporting shoulder 21' is formed by a projection 21 of the storage element 20. The storage element 20 is acted upon by a storage element spring 26, which is realized in the form of a pressure spring and supported on a wall section 31 of a guide rib 29, on the side lying opposite of the projection 21.

The storage element 20 has a contact flank or sliding flank 23, which rests on a control flank 8 of the rotary latch 3 pointing away from the rotational axis 5, on its side that points toward the control flank 8. The sliding flank or contact flank 23 extends as far as the projection 21.

The supporting shoulder 21' is followed by a contact flank 21" that extends approximately perpendicular to the supporting shoulder 21' and borders on another supporting shoulder 22, which essentially extends parallel, but offset to the supporting shoulder 21'.

The bottom of the housing 1 forms a guide with a U-shaped rib 29. A guide groove 28 extends between two sections 29' and 29" of the guide rib 29 and a guide section 48 of the storage element 20 is guided in said guide groove. The guide section 48 of the storage element 20 lies between the walls of the sections 29' and 29" with a lateral clearance such that the storage element 20 can also be slightly pivoted. The guide section 48 may have lateral wings 53 that are arranged on the side lying opposite of the projection 21 and spaced apart from one another by a distance that approximately corresponds to the inner width of the guide groove 28 such that the storage element 20 can be pivoted about these two wings 53.

The above-described sliding flank 23 or the projection 21 may be respectively formed by a control section 49 of the storage element 20, which protrudes from the guide groove 28.

Figure 2:
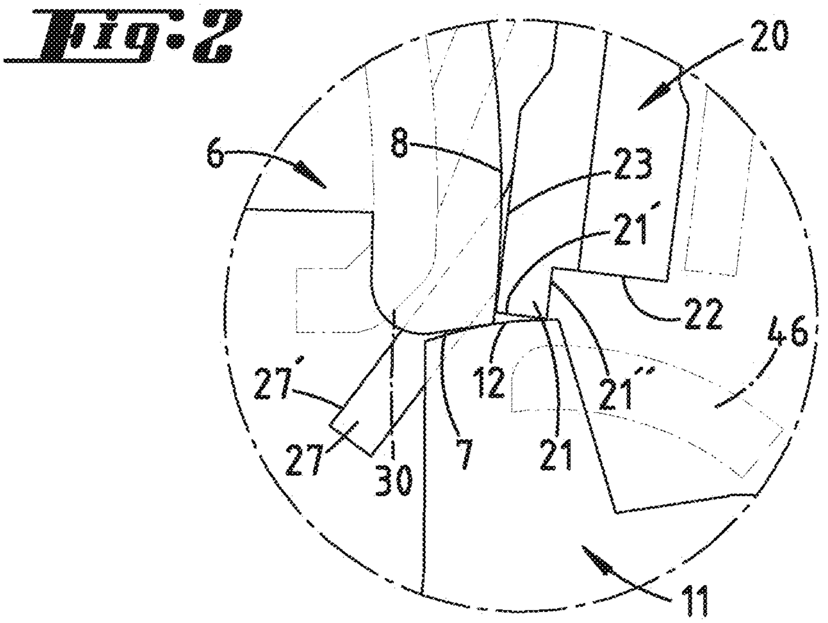
FIG. 2 shows the enlarged detail II in FIG. 1.
Figure 3:
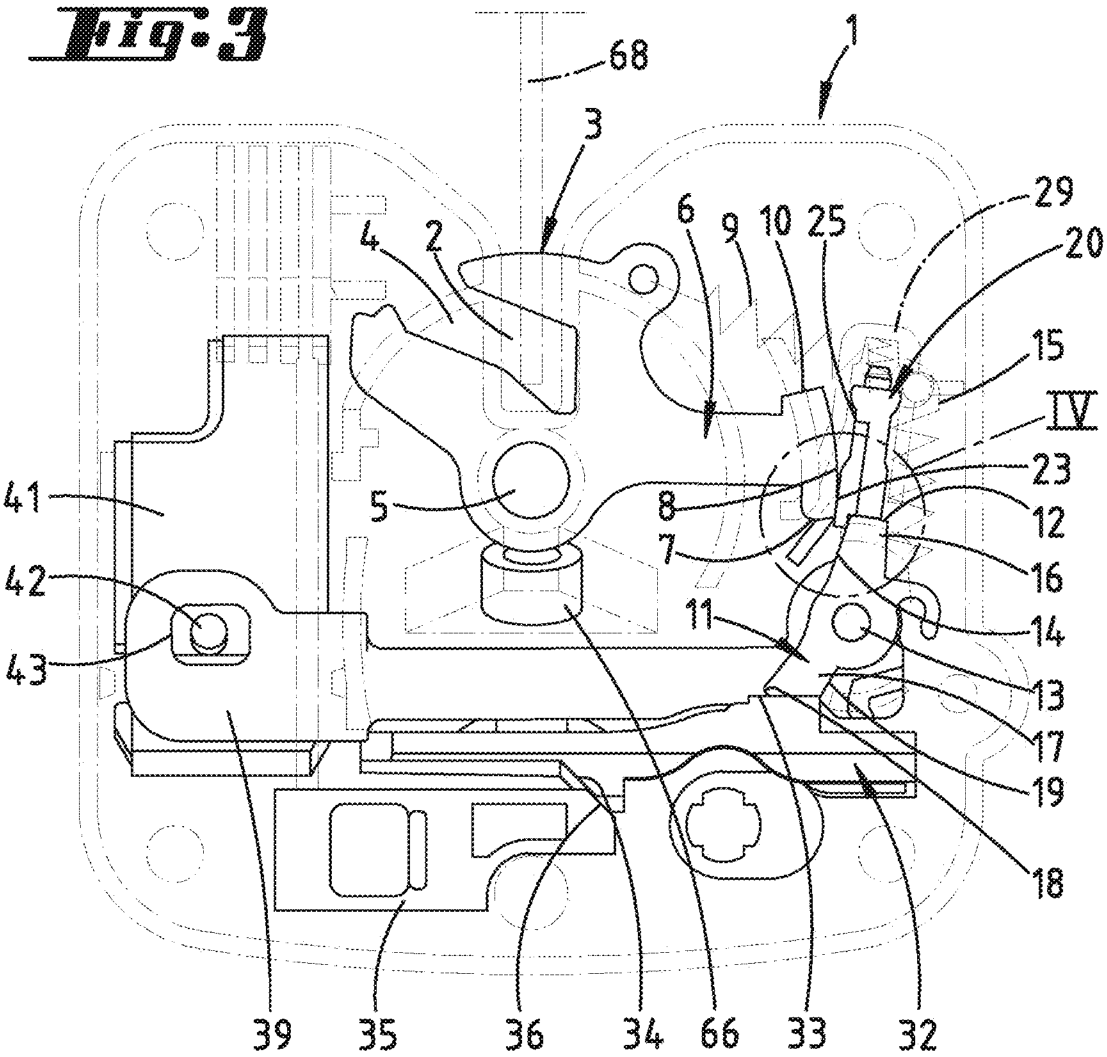
FIG. 3 shows a view according to FIG. 1, in which the pawl 11 is displaced into a release position due to the displacement of a trigger 32 and a storage element 20 is displaced from a rest position into a storage position.
Figure 4:
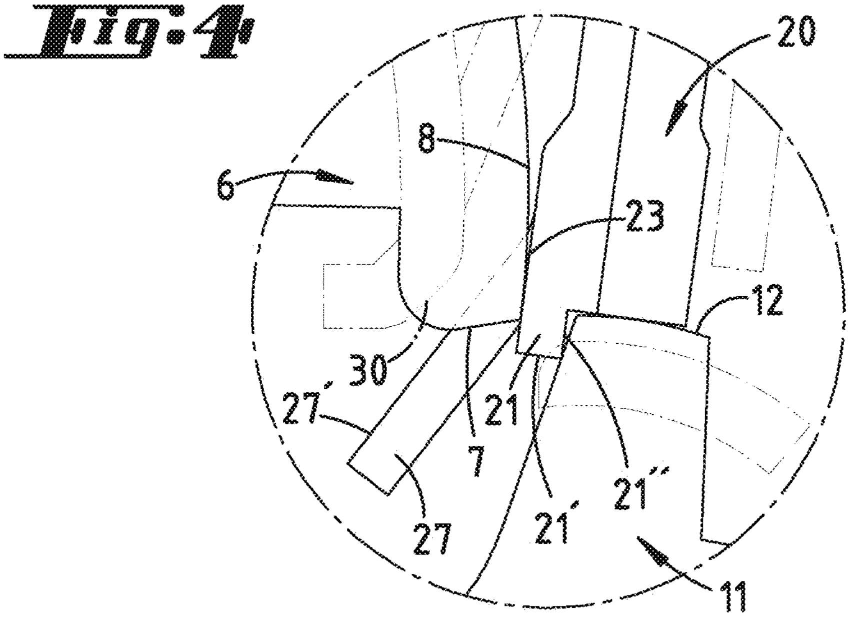
FIG. 4 shows the enlarged detail IV in FIG. 3.

When the pawl 11 is displaced from the locking position illustrated in FIGS. 1 and 2 into the release position illustrated in FIGS. 3 and 4 due to a displacement of the trigger 32, the locking shoulder 12 of the pawl 11 slides away underneath the supporting shoulder 7 such that the locking shoulder no longer lies in the path of movement of the supporting shoulder 7. The displacement of the trigger 32 furthermore causes the pawl 11 pivot to such an extent that the locking shoulder 12 also slides away underneath the supporting shoulder 21' and the storage element 20 can be displaced into the storage position illustrated in FIGS. 3 and 4 by the pretensioned storage element spring 26, wherein the contact flank 21" rests on a section of a flank 14 of the pawl 11, which is located adjacent to the locking shoulder 12, in said storage position. The supporting shoulder 22 of the storage element 20 is supported on the locking shoulder 12 in the storage position.

Figure 5:
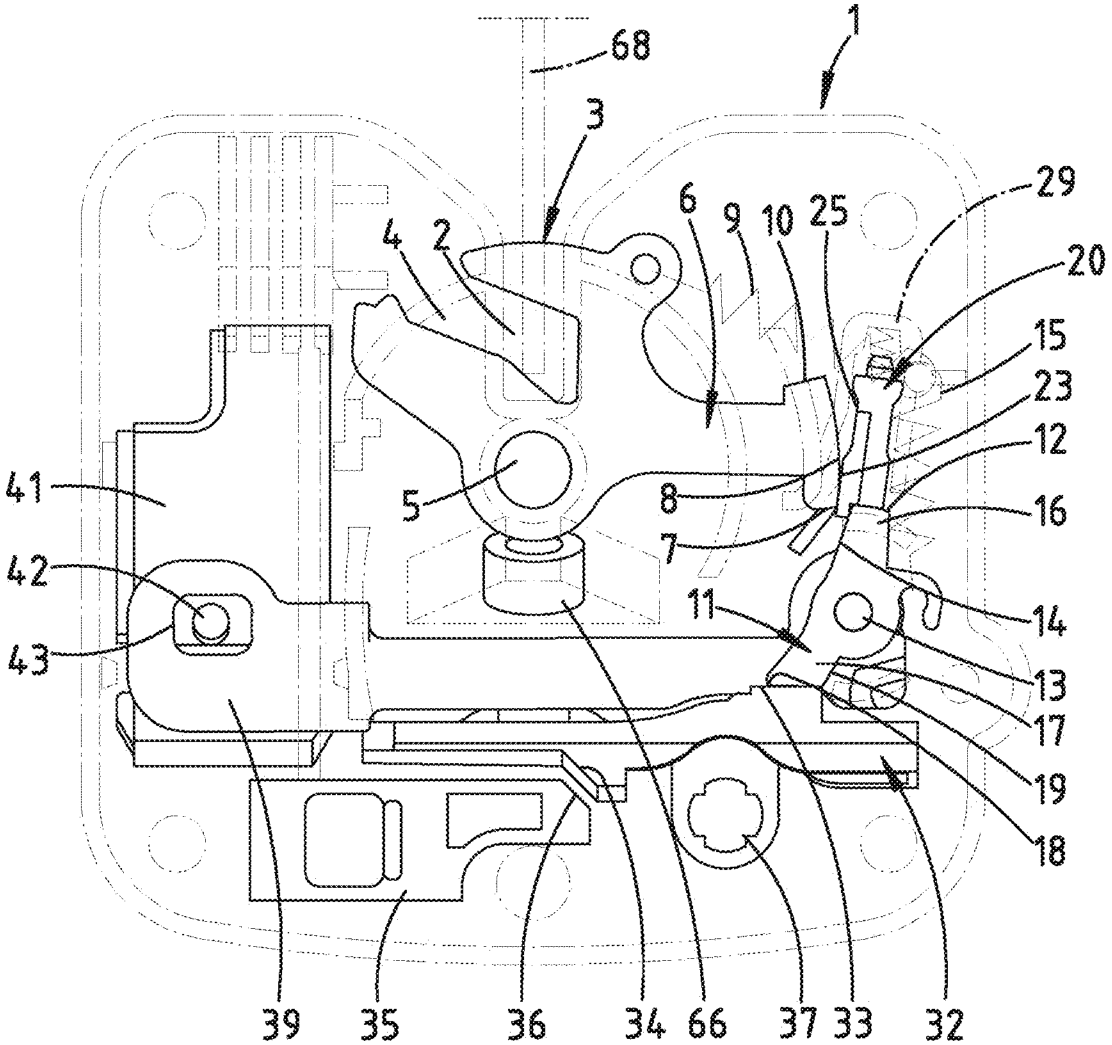
FIG. 5 shows a view according to FIG. 3, but the trigger 32 was displaced into a release position in this case due to a rotation of a closing cylinder 37.

The rotary latch 3 remains in its closed position (see FIG. 5) when the hinged lid of a rubbish bin is acted upon by an external force in such a way that a counter closing part, e.g. a closing element 68, is supported on a flank of the forked mouth 4 of the rotary latch 3 and the rotary latch cannot be rotated into the open position by the pretensioned rotary latch spring 9.

When an actuation of the trigger 32 is suspended (see FIG. 6) starting from this operating position such that the triggering flank 33 no longer acts upon the triggering flank 18 of the triggering arm 17, the pawl 11 cannot be displaced back into the locking position by the pawl spring 15, which may be realized in the form of a tension spring, because the flank 14 lies in front of the contact flank 21" or the projection 21, respectively.

Figure 6:
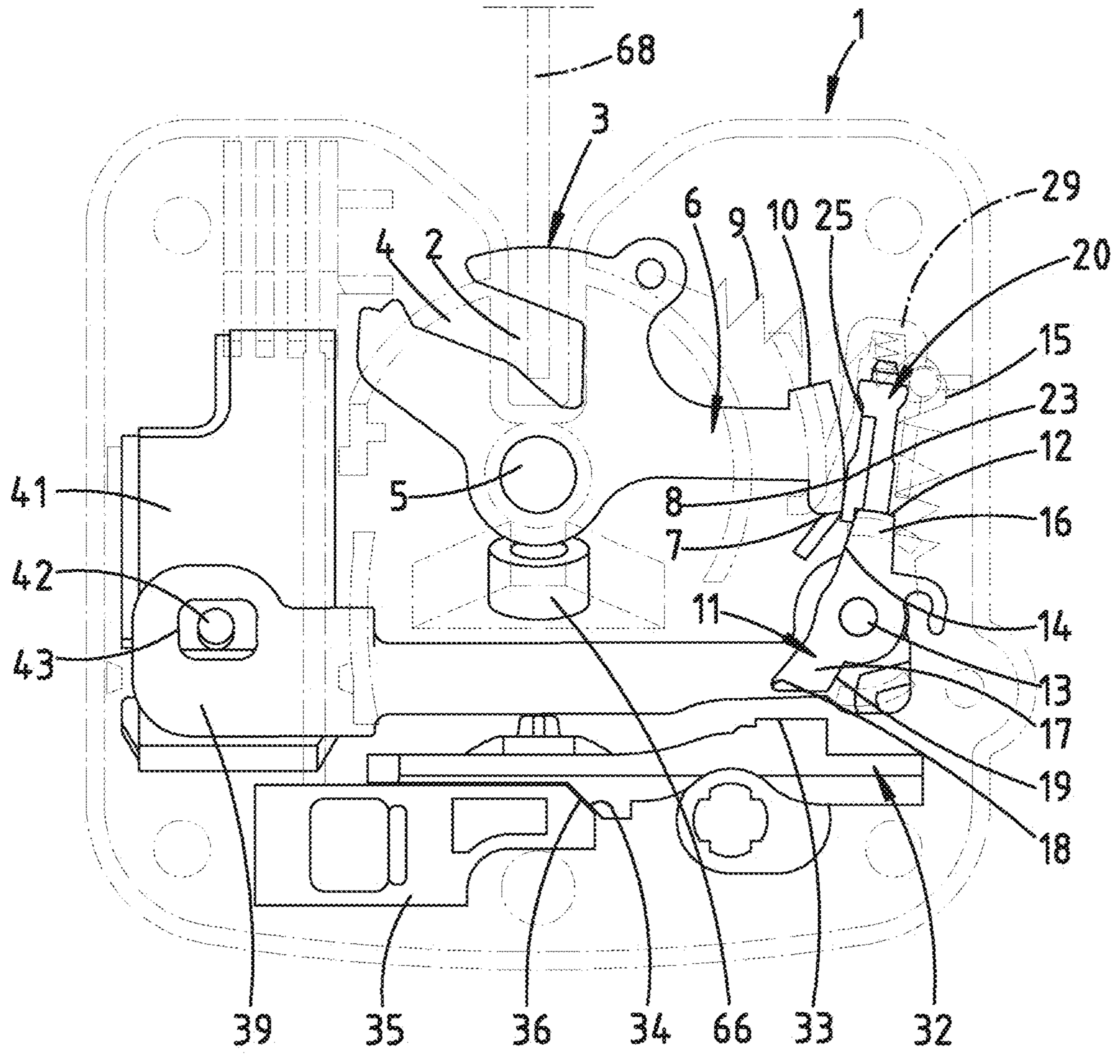
FIG. 6 shows a follow-up view to FIG. 5, in which the trigger 32 is displaced backward.
Figure 7:
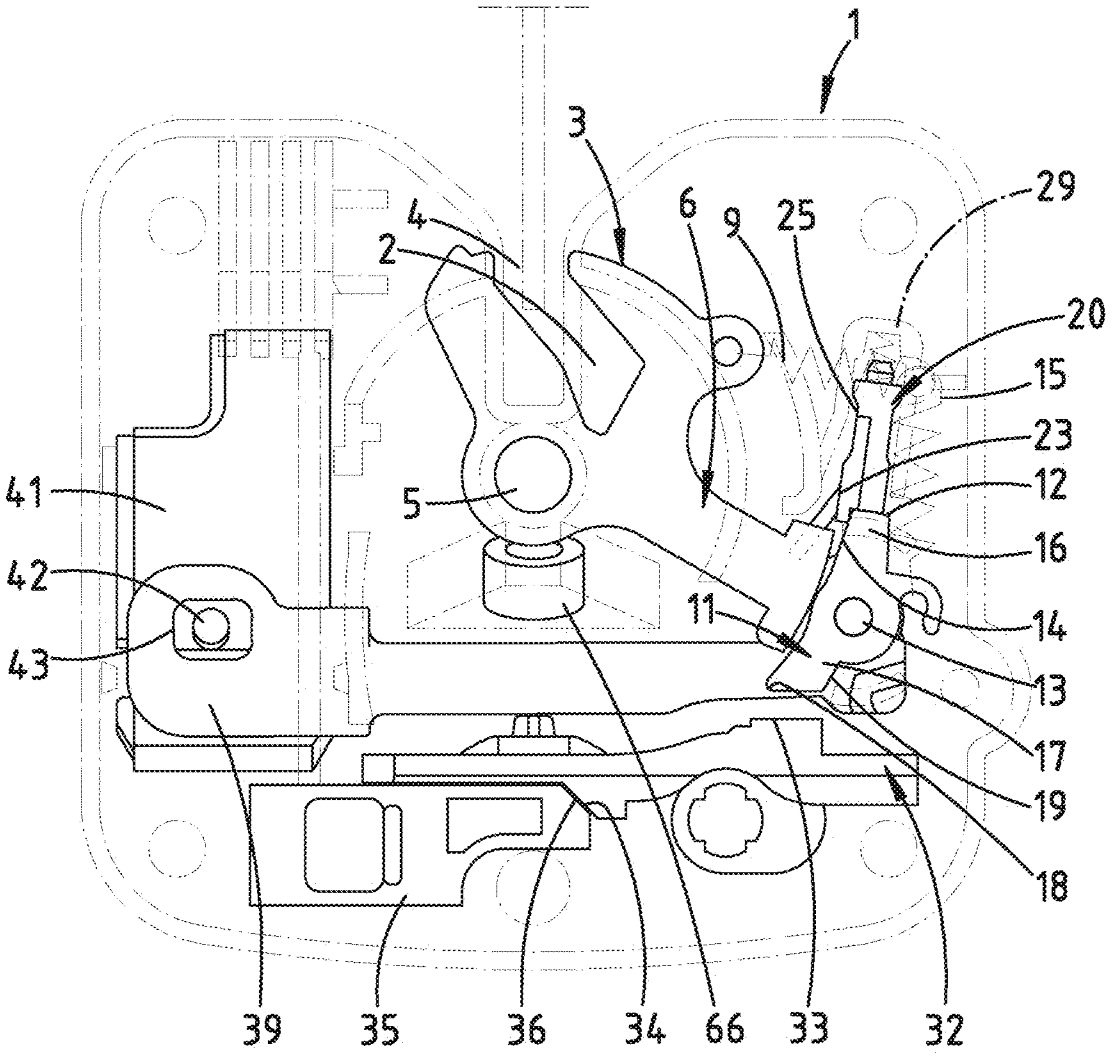
FIG. 7 shows a follow-up view to FIG. 6 after the rotary latch 3 has reached its open position.

The rotary latch 3 can rotate into the operating position illustrated in FIG. 7 when the hinged lid of a rubbish bin is raised starting from the operating position illustrated in FIG. 6. In the process, the control flank 8 initially slides along the sliding contact flank 23 and subsequently along the flank 14 of the pawl 11.

The pivoting movement of the storage element 20 leads to a simultaneous pivoting movement of the pawl 11.

Figure 8:
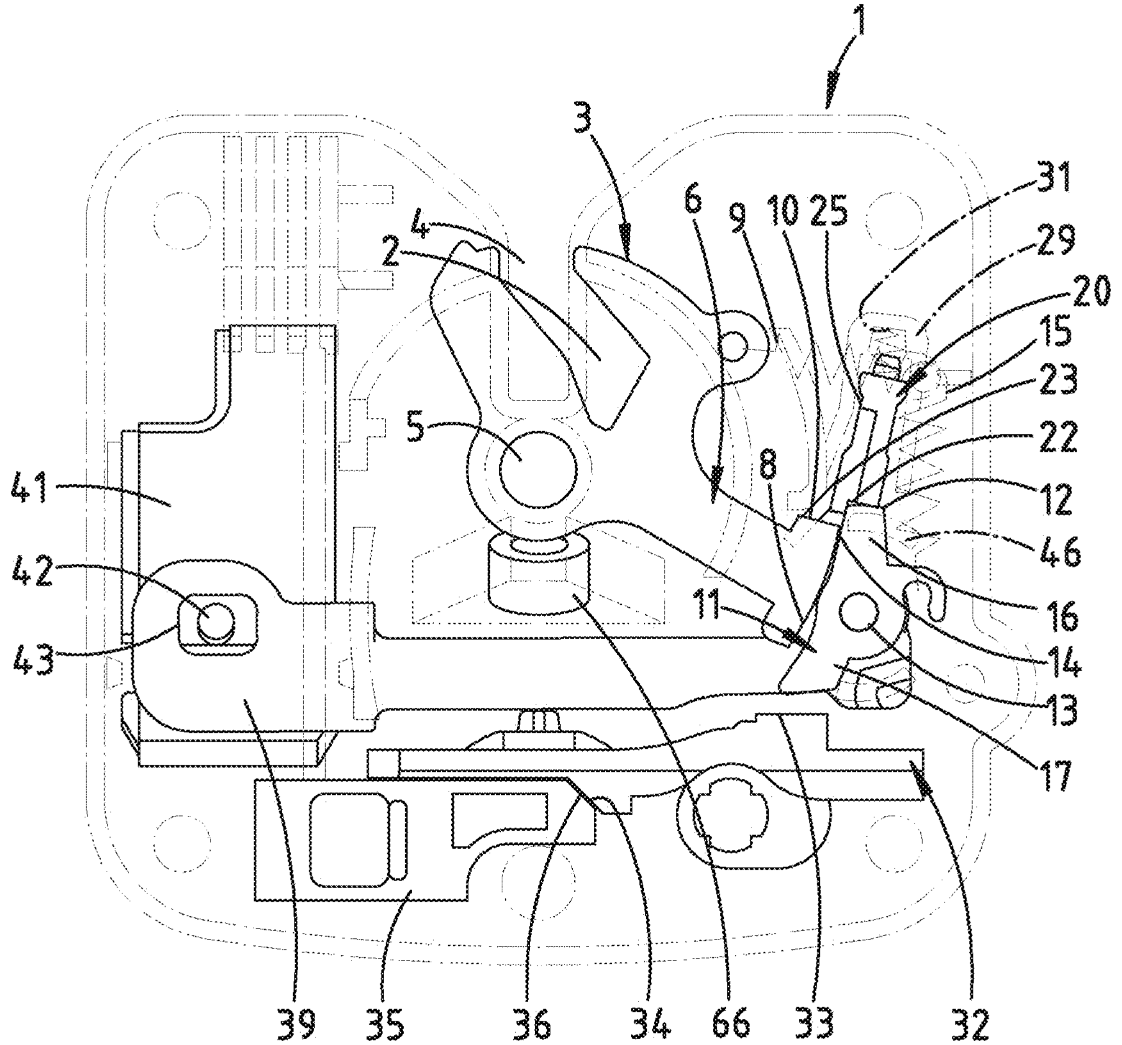
FIG. 8 shows a follow-up view to FIG. 7, in which the pawl 11 has slightly pivoted about the pivoting axis 13 until its flank 14 rests on the control flank 8 of the rotary latch.

The rotary latch 3 ultimately reaches the open position illustrated in FIGS. 7 and 8, in which the closing element can move out of the forked mouth 4 of the rotary latch 3. In this position, the control arm 6 of the rotary latch 3 has completely run over the storage element 20 such that the flank 14 of the pawl 11 can be supported on the control flank 8 of the rotary latch 3. The supporting shoulder 21' or the projection 21 now respectively lies in front of a control shoulder 10 of the control arm 6.

In this position, the supporting shoulder 22 of the storage element 20 can be supported on a supporting element 46 that is fixed on the housing and may be realized in the form of a rib. Depending on the width of the supporting shoulder 22, however, the supporting shoulder 22 may also be supported on the locking shoulder 12 of the pawl 11 as illustrated, for example, in FIG. 8.

Figure 10:
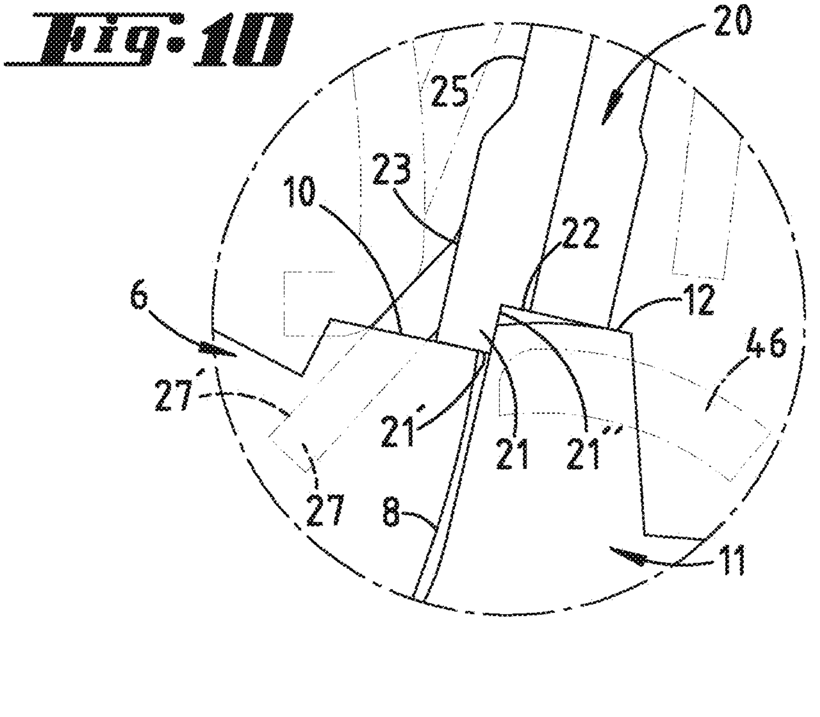
FIG. 10 shows the enlarged detail X in FIG. 9.
Figure 11:
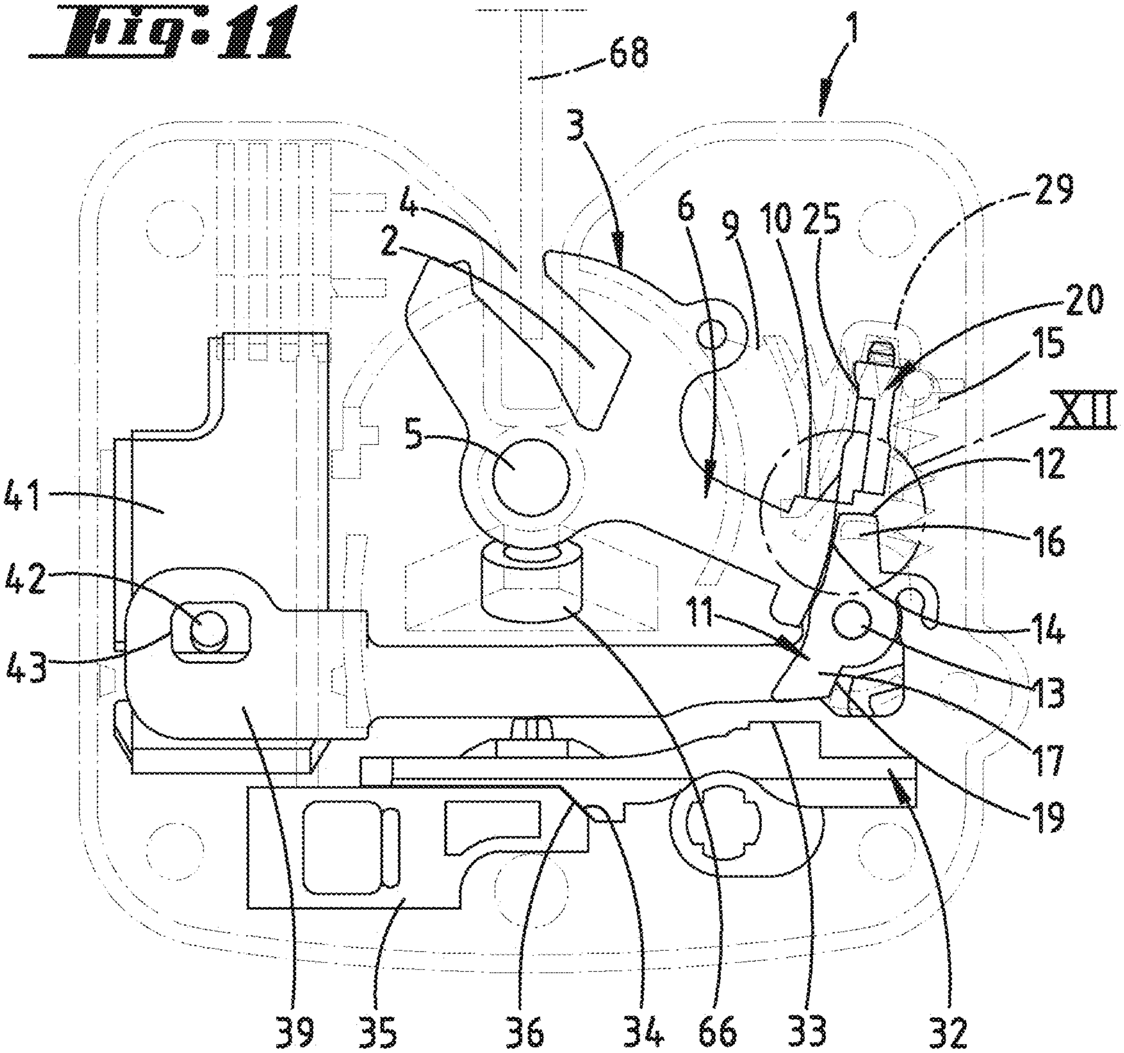
FIG. 11 shows a follow-up view to FIG. 9, in which the control shoulder 10 has raised the storage element 20 and the storage element 20 is about to leave the control shoulder 10.
Figure 12:
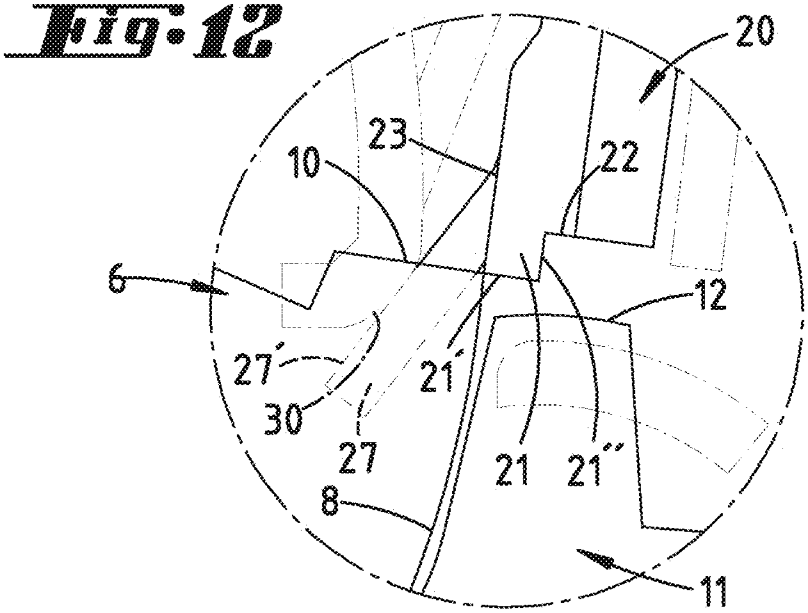
FIG. 12 shows the enlarged detail XII in FIG. 11.
Figure 13:
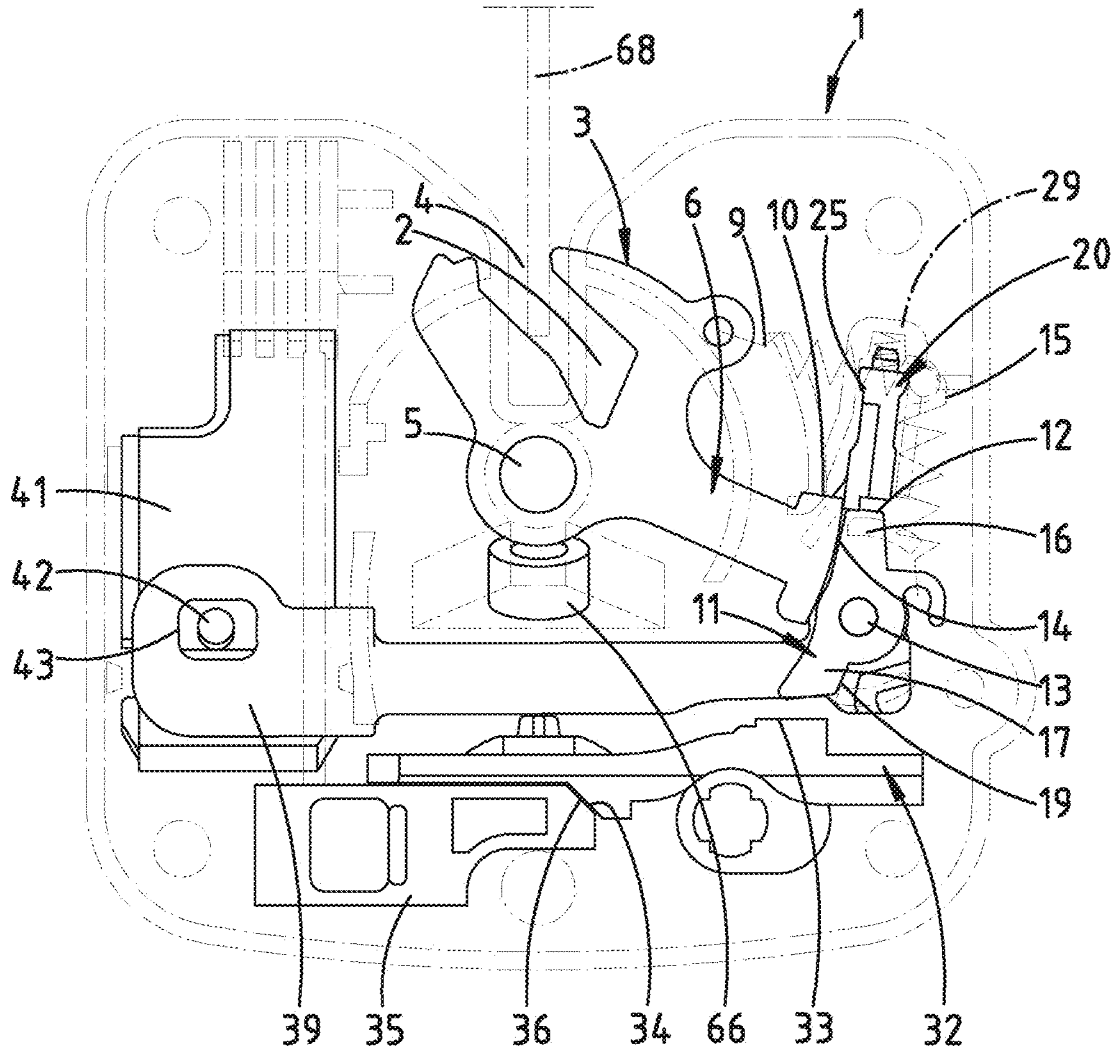
FIG. 13 shows a follow-up view to FIG. 11, in which the storage element 20 has left the control shoulder 10 and is supported on a locking shoulder 12 of the pawl 11.
Figure 14:
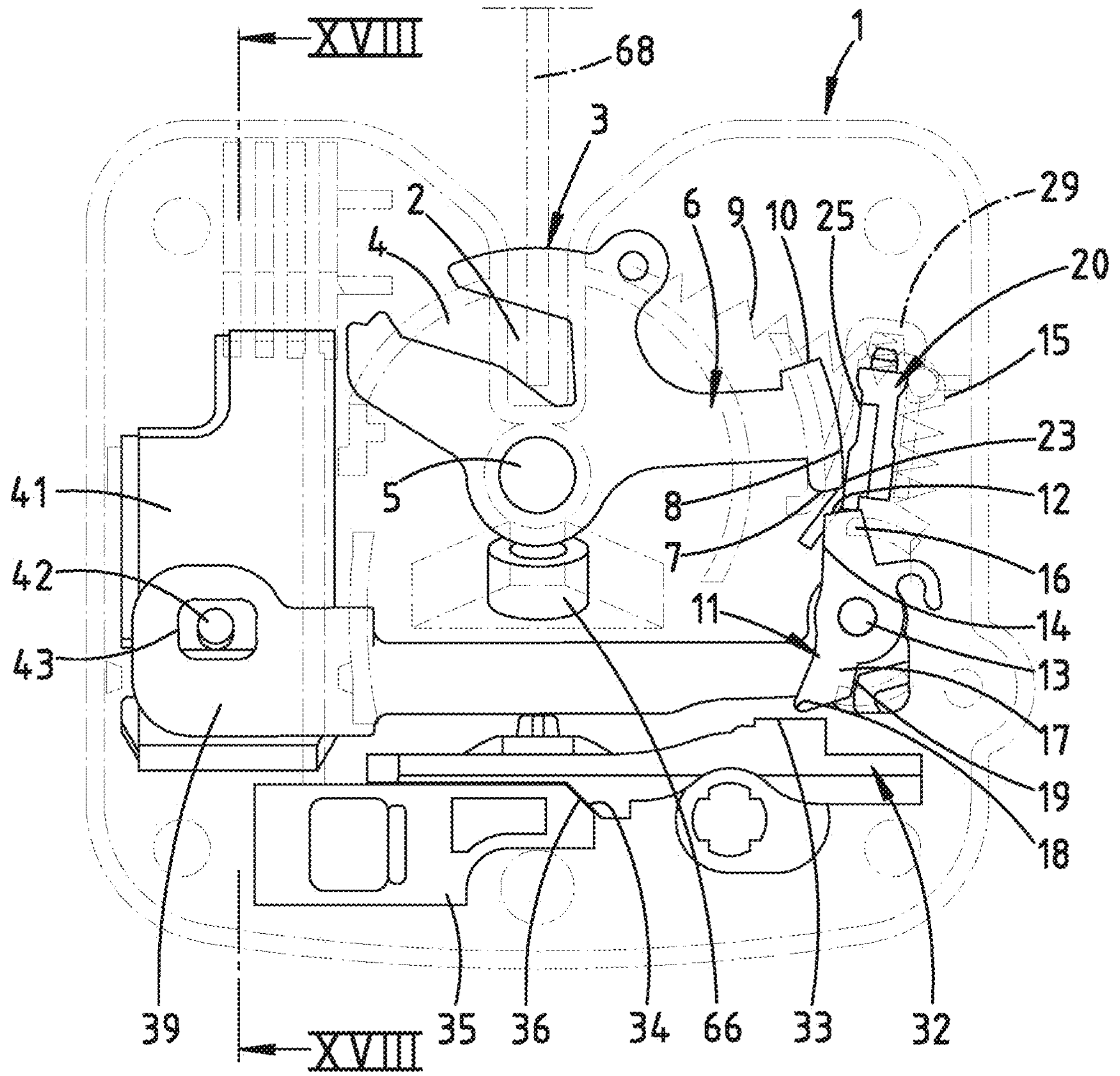
FIG. 14 shows a follow-up view to FIG. 13, in which the rotary latch 3 assumes a slight overstroke position, in which the supporting shoulder 7 is spaced apart from the locking shoulder 12 of the pawl 11, but the sliding contact surface 23 is still supported on the control flank 8.

When the hinged lid is closed starting from the open position illustrated in FIG. 8 such that the closing element can engage into the forked mouth 4, this is accompanied by a pivoting movement of the rotary latch 3 from its open position into the closed position as illustrated in FIG. 14. In the process, the control flank 8 slides along the flank 14 of the pawl in order to reach the position illustrated in FIGS. 9 and 10, in which the control shoulder 10 engages underneath the projection 21 and rests on the supporting shoulder 21'. The control shoulder 10 raises the storage element 20 into the position illustrated in FIGS. 11 and 12 due to an engagement on the projection 21 or the supporting shoulder 21' until a control flank 27' formed by a control arm 27 of the storage element 20 abuts on a guide projection 30. The accompanying guidance leads to a pivoting movement of the storage element 20, during which the projection 21 or the supporting shoulder 21' respectively leaves the control shoulder 10 in order to be supported on the locking shoulder 12 of the pawl 11 again.

Once the rotary latch 3 reaches its starting position illustrated in FIG. 1, the pawl spring 15 displaces the pawl 11 into its locking position, in which the locking shoulder 12 engages underneath the supporting shoulder 7 of the control arm 6.

A locking body 66 is seated in a bearing recess 65 formed by a trough and can place itself in front of the triggering lever 39 during a clockwise or counterclockwise rotation of the housing from the position illustrated in FIG. 1 in order to thereby prevent the rotary latch from opening when the lock is not tilted about the specified tilting axis. In the exemplary embodiment, the locking body 66 is a roller body that can roll along bevels of the bearing recess 65, which extend in a V-shaped manner to one another.

FIG. 14 shows the rotary latch 3 in a slight overstroke position, in which the supporting shoulder 7 is spaced apart from the locking shoulder 12. However, the tensile force of the rotary latch spring 9 displaces the rotary latch 3 back into the operating position illustrated in FIG. 1.

Figure 15:
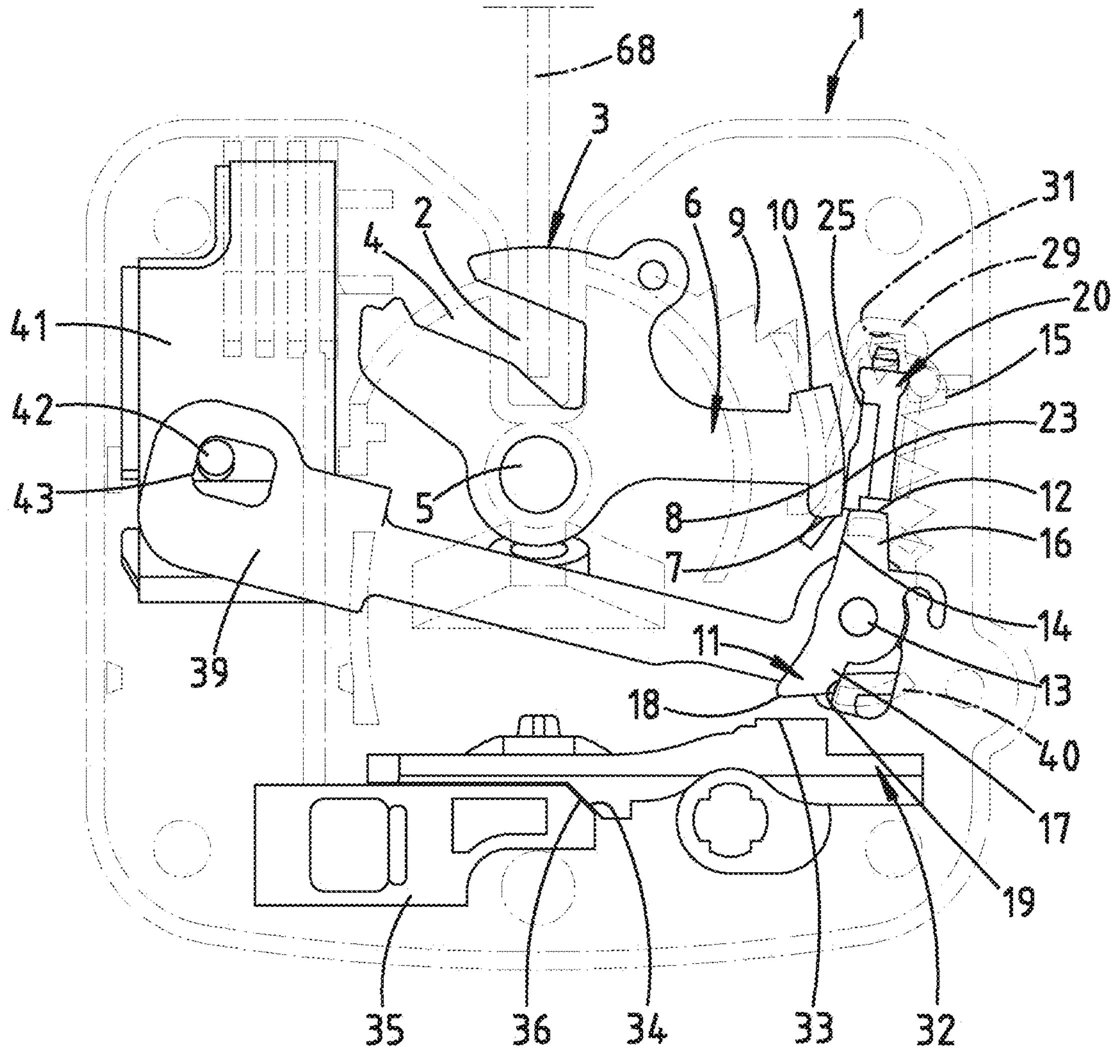
FIG. 15 shows a view similar to FIG. 6, in which the pawl 11 was not moved into the release position due to the displacement of a trigger 32, but rather due to the pivoting movement c H triggering lever 39 as a result of a sliding displacement of a weight 41 within the housing 1.

In the exemplary embodiment, a displacement of the triggering lever 39 in the course of a displacement of the weight 41 from the position illustrated on the bottom in FIG. 1 into the upper position illustrated in FIG. 15 results in the triggering flank 19 of the triggering arm 17 being acted upon by the projection 40 of the triggering lever 39. The maximum accompanying pivoting angle of the pawl 11 is smaller than the pivoting angle attainable by actuating the trigger 32. As a result, the locking shoulder 12 merely leaves the supporting shoulder 7 of the control arm 6 of the rotary latch 3, but not the supporting shoulder 21'.

The storage element 20 remains in its rest position in the pivoting position of the pawl 11 attainable due to a displacement of the weight 41. The sliding contact flank 23 is aligned with the flank 14 of the pawl 11. The rotary latch 3 can in fact be displaced into the open position starting from this release position of the pawl 11, but only as long is the weight 41 maintains its upper position illustrated in FIG. 15. The pawl 11 can once again pivot back into the locking position if the weight 41 was previously displaced back again.

Figure 16:
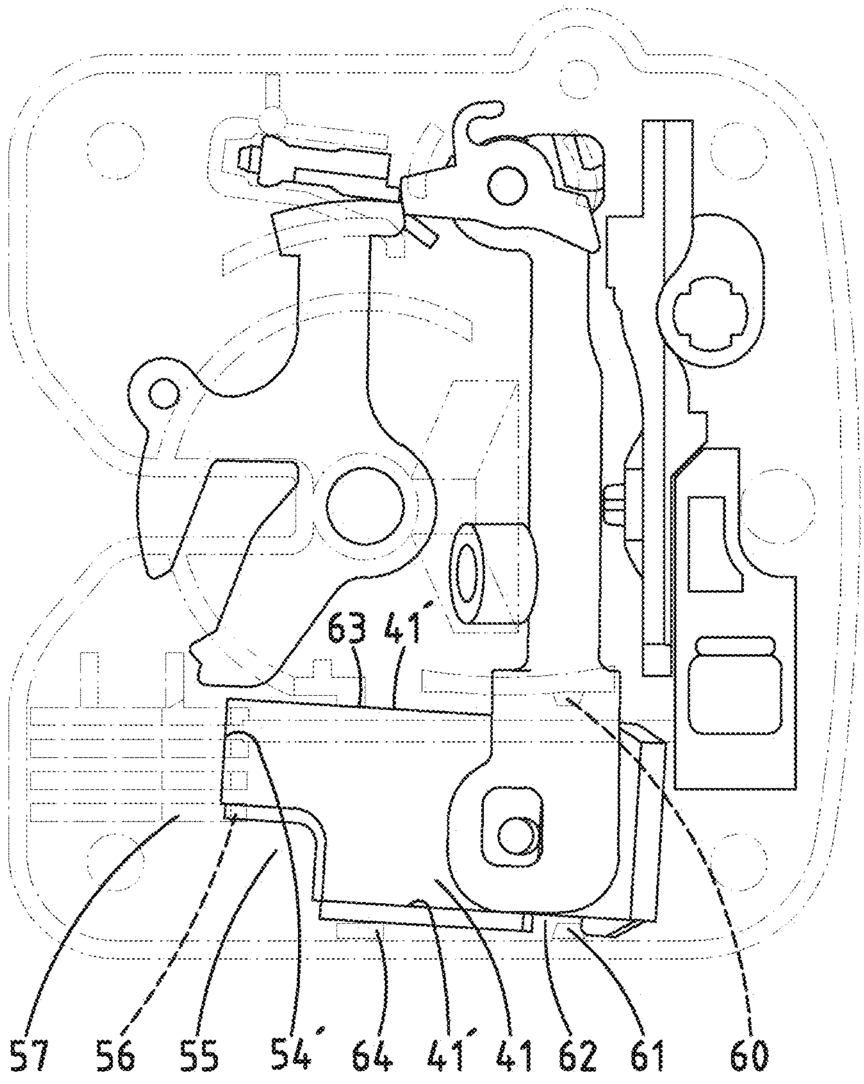
FIG. 16 shows a view as in FIG. 1, in which the lock housing was tilted by 90 degrees in the counterclockwise direction and the weight 41 was displaced about a tilting support 64 in such a way that a locking lug 61 engages into a catch recess 62 of the weight 41 in order to initially inhibit a displacement of the weight 41 into the position illustrated in FIG. 15 during an additional tilting movement of the lock housing.

The weight 41 pivots about a tilting support 64 protruding from the housing when the lock housing is rotated in the counterclockwise direction by 90 degrees from the position illustrated in FIG. 1, in which the catcher points upward in order to capture a counter closing part such as a closing element 68 or a striker and the weight 41 lies on the bottom, into the operating position illustrated in FIG. 16. Since the greater mass fraction of the weight 41 lies on the right side of the tilting support 64 in this case, the weight 41 tilts into the tilting position illustrated in FIG. 16, in which a locking lug 61 protruding from the housing engages into a catch recess 62. If the lock is additionally pivoted in the counterclockwise direction starting from the position illustrated in FIG. 16, the locking lug 61 engaging into the catch recess 62 initially prevents a linear displacement of the weight 41 into the triggering position. This displacement is only possible once the connection between the catch recess 62 and the locking lug 61 is disengaged. This may take place due to gravity in that a flank of the catch recess 62 slides over an inclined surface of the locking lug 61.

Figure 17:
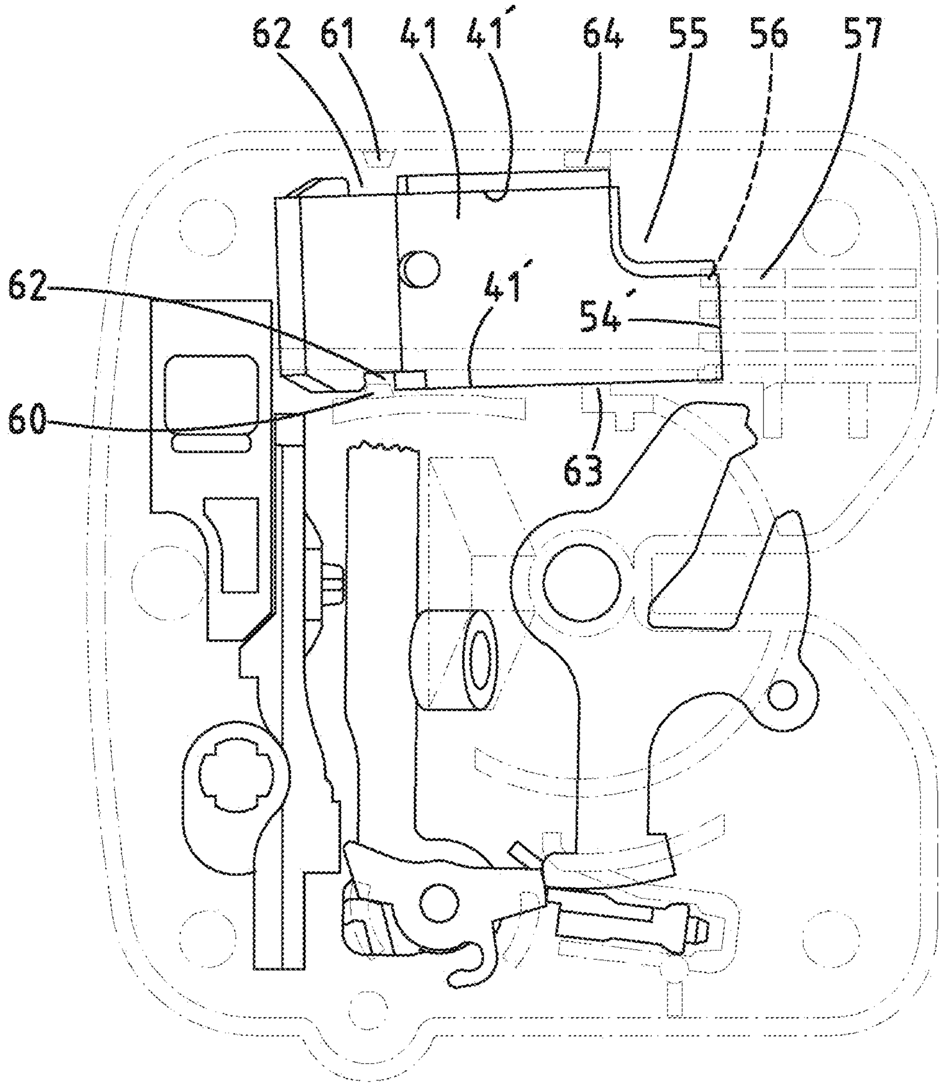
FIG. 17 shows a view as in FIG. 1, in which the lock housing was tilted by 90 degrees in the clockwise direction and the weight 41 was displaced about a tilting support 63 in such a way that a locking lug 60 engages in a catch recess 62 of the weight 41 in order to initially inhibit a displacement of the weight 41 into the position illustrated in FIG. 15 during an additional tilting movement of the lock housing.

The weight 41 pivots about a tilting support 63, on which a sidewall 41' of the weight 41 is supported, when the lock housing is rotated in the clockwise direction by 90° from the position illustrated in FIG. 1, in which the catcher points upward in order to capture the counter closing part and the weight 41 lies on the bottom, into the operating position illustrated in FIG. 17. Since the greater mass fraction of the weight 41 lies on the left side of the tilting support 63 in this case, the weight 41 tilts into the tilting position illustrated in FIG. 17, in which a locking lug 60 protruding from the side of a sliding channel, the bottom of which forms the sliding surface 55, engages into a recess catch 62 of the sidewall 41' of the weight 1. The locking lug 60 has a trapezoidal cross-section and therefore forms inclined surfaces, on which an edge flank of the catch recess 62 can rest. In this case, a displacement of the weight 41 into the triggering position as a result of an additional pivoting movement of the lock in the clockwise direction is initially also prevented. The displacement of the weight 41 initially is inhibited by the locking lug 60 engaging into the catch recess 62. The weight 41 can only slide into the triggering position once this inhibition is suspended in the course of an additional pivoting movement of the lock.

Figure 18:
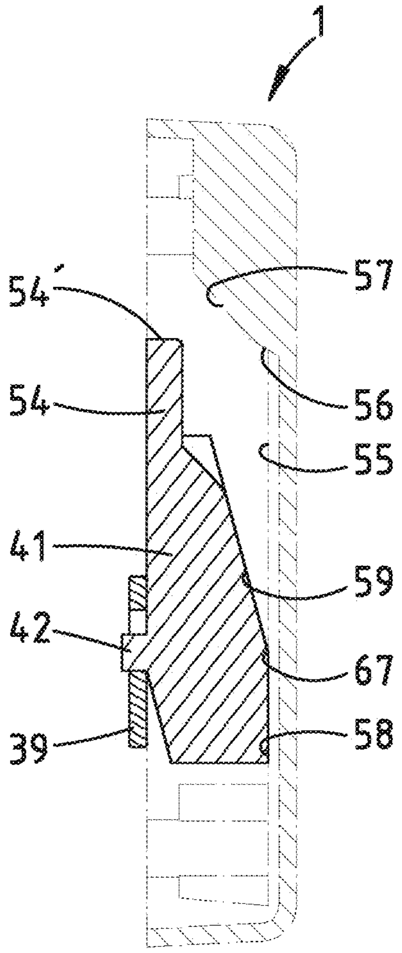
FIG. 18 shows the section along the line 18-18 in FIG. 14 in an upright position of the lock, in which the weight 41 is supported on a sliding surface 55 with a plane surface 58 and a front edge 54' of an extension 54 is spaced apart from a locking step 56.

In the section illustrated in FIG. 18, the weight 41 is in a rest position, in which a rear surface 58 rests on a plane sliding surface 55 of the bottom of the housing 1. The surface 58 is followed by a surface 59 that obliquely protrudes from the sliding surface 55 in the position illustrated in FIG. 18. The surface 59 borders on the surface 58 such that a tilting axis 67 is formed. The weight 41 has an extension 54 that forms a front edge 54'.

FIG. 18 shows an upright position of the weight 41, which can be assumed when no torque is exerted upon the pin 42 by the triggering lever 39. However, if the triggering lever is designed in such a way that it exerts a torque upon the pin 42 when the downwardly directed lateral surface of the weight 41 in FIG. 18 cannot be supported on the housing, the position illustrated in FIG. 18 is an unstable position because the weight has the tendency to pivot in the clockwise direction until the surface 59 rests on the sliding surface 55. This position then corresponds to the position illustrated in FIG. 19.

The sliding surface 55 is followed by an obliquely extending locking step 56 and the locking step 56 followed by an inclined surface 57. The locking step 56 is arranged in the housing 1 in such a way that a tilting movement of the weight 41 about the tilting axis 67 in the rest position of the weight 41 leads to a displacement of the front edge 54' in front of the locking step 56. This takes place, for example, when the lock is pivoted in the clockwise direction by 90 degrees from the position illustrated in FIG. 18 into the position illustrated in FIG. 19. The tilting axis 67 is arranged in such a way that the displacement takes place in a gravity-controlled manner.

Figure 19:
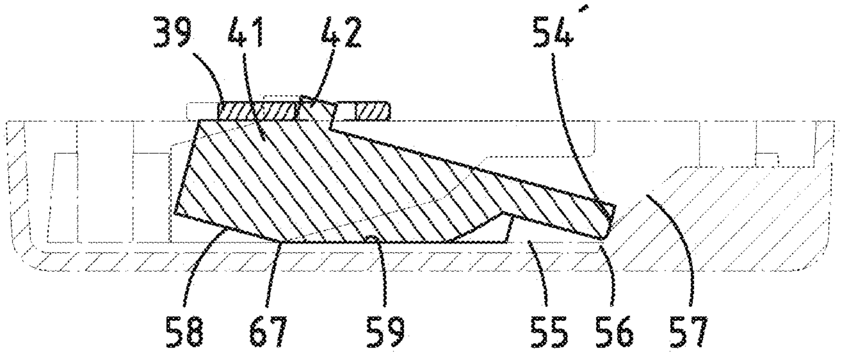
FIG. 19 shows a follow-up view to FIG. 18, in which the lock housing was tilted by 90 degrees in the clockwise direction such that the weight is tilted about a tilting axis 67 and a surface 59 bordering on the surface 58 rests on the sliding surface 55 and the front edge 54' lies in front of the locking step 56.
Figure 20:
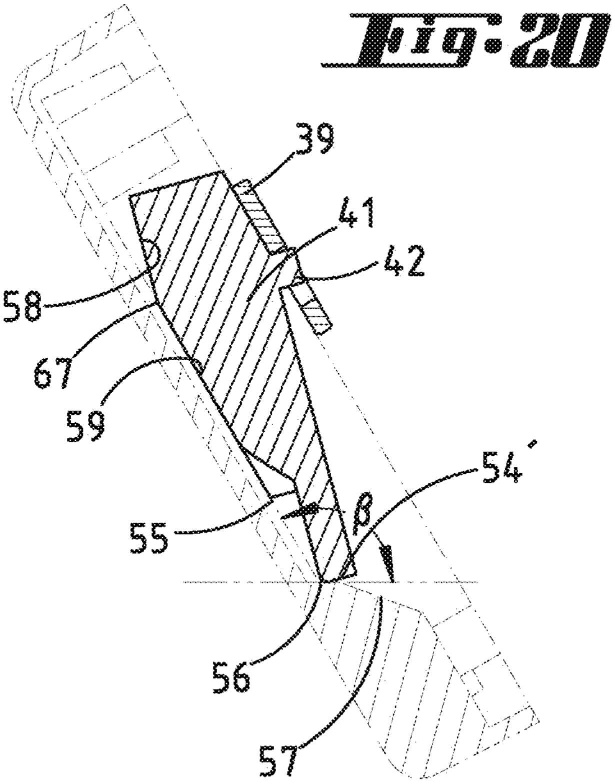
FIG. 20 shows a follow-up view to FIG. 19, in which the lock housing is additionally rotated in the clockwise direction to such an extent that the locking step 56 lies in a horizontal plane, but the weight 1 is still held in its rest position.
Figure 21:
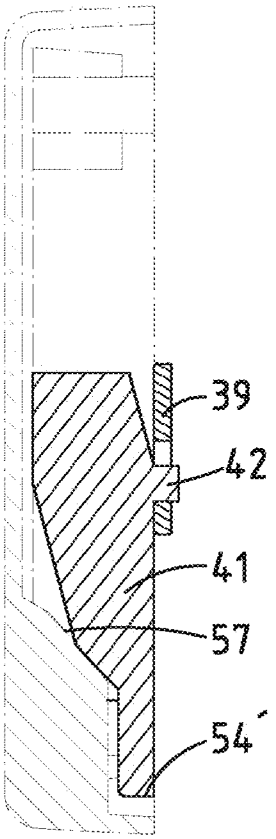
FIG. 21 shows a follow-up view to FIG. 20, in which the lock housing was additionally rotated in such a way that the front edge 54' has left the locking step 56 and the weight 1 was displaced into its triggering position.
Figure 22:
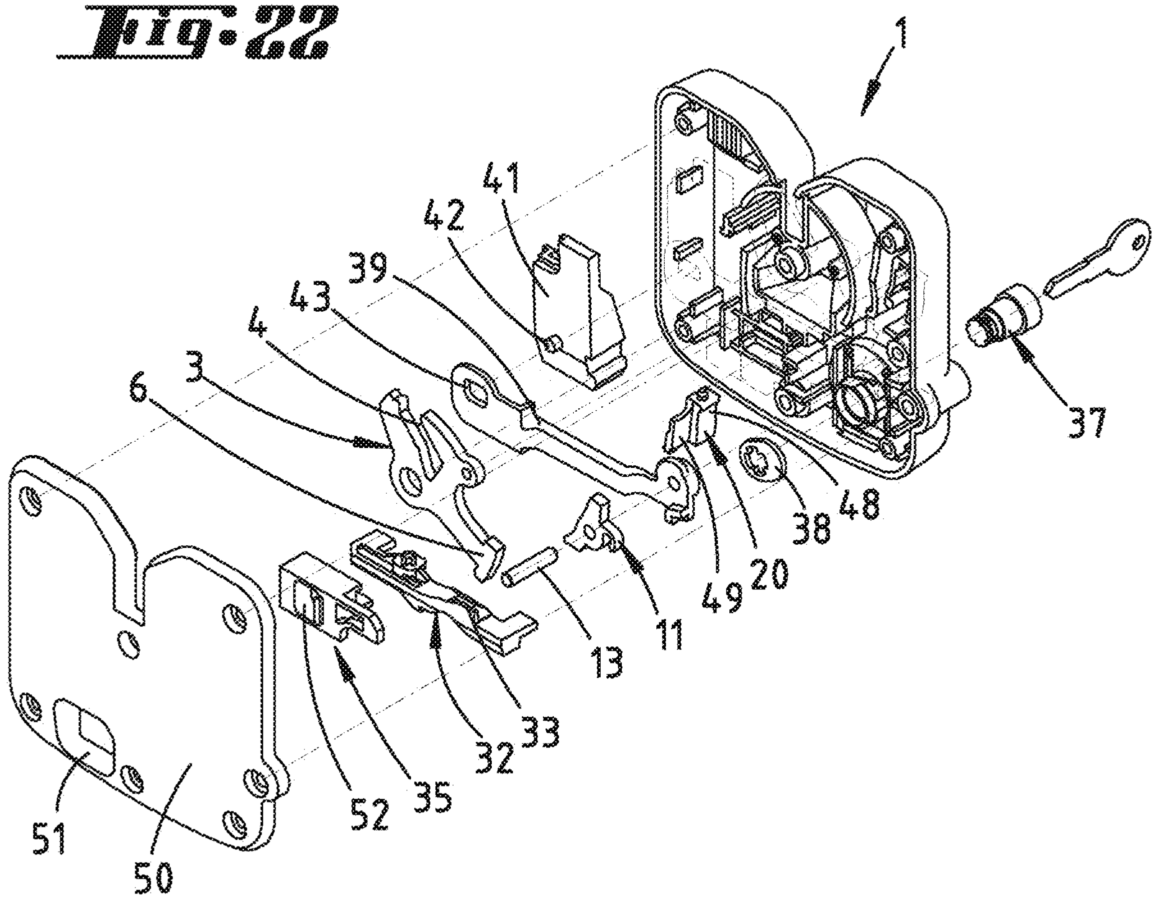
FIG. 22 shows an exploded view of the lock.
Figure 23:
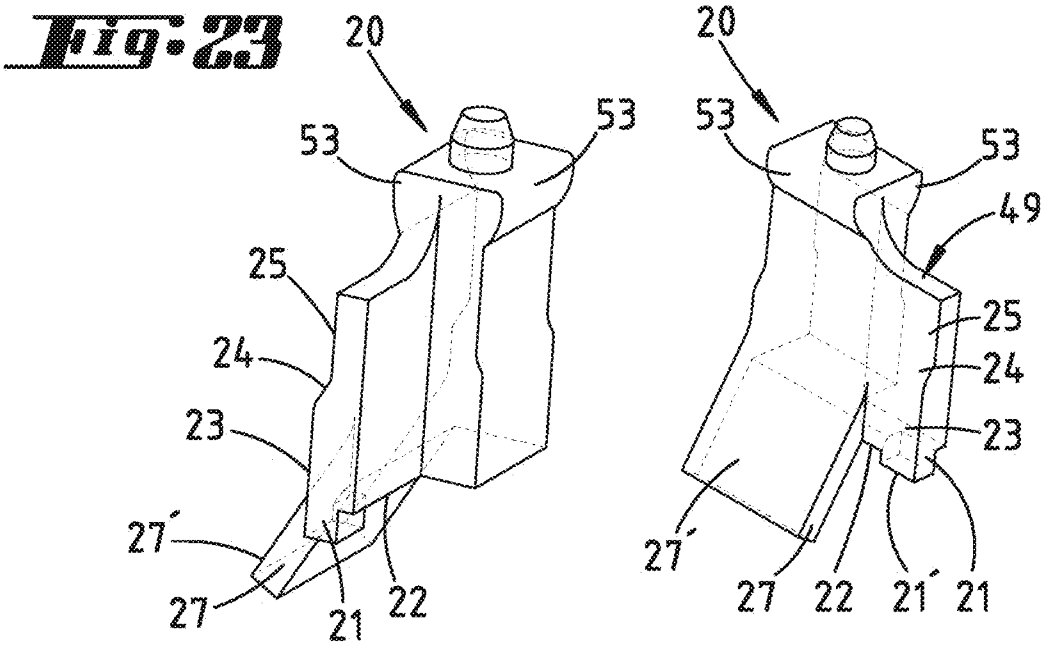
FIG. 23 shows the storage element 20 in the form of two enlarged perspective views.
Figure 24:
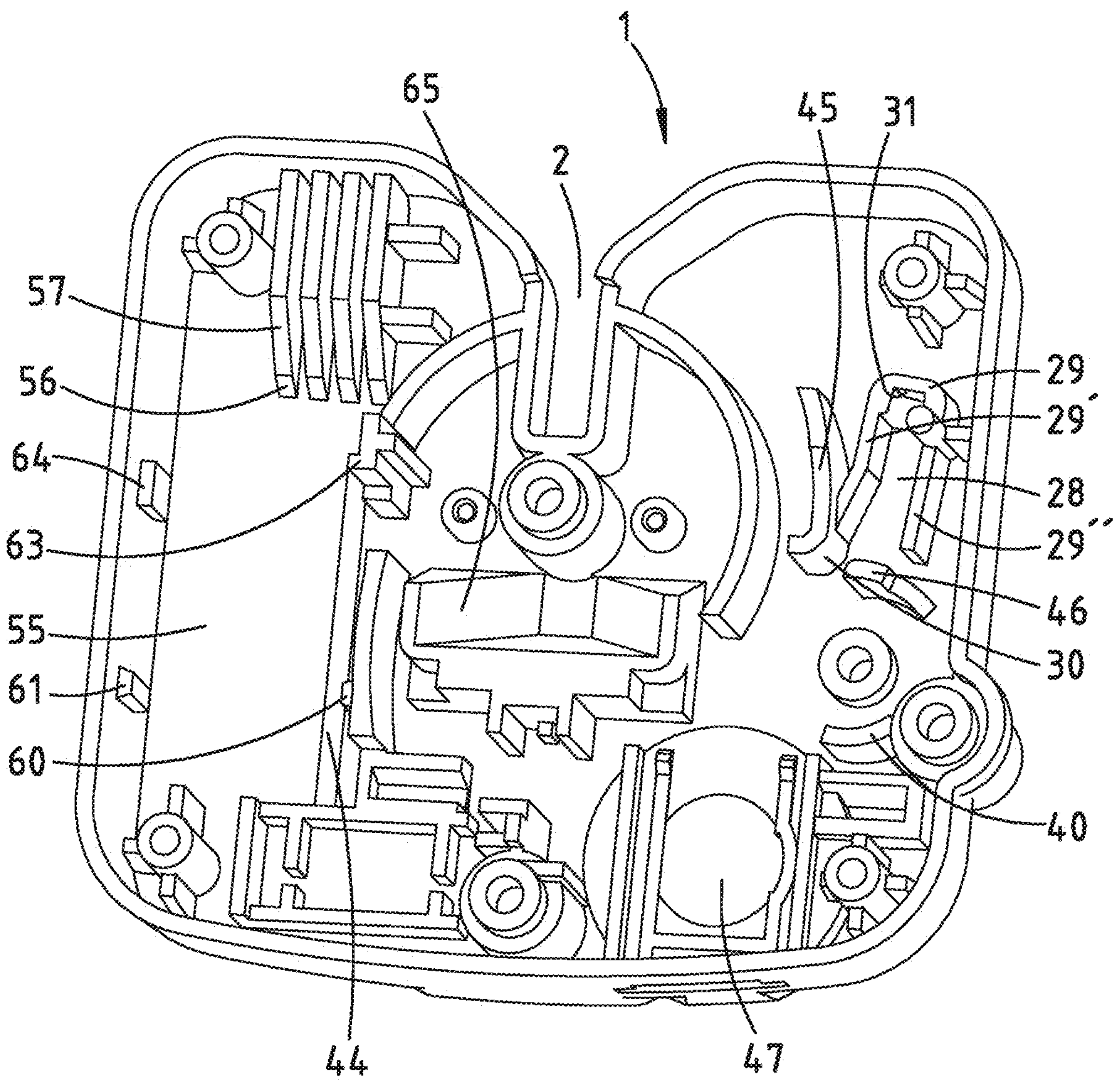
FIG. 24 shows a perspective view of the lock housing.

When the lock is additionally pivoted in the clockwise direction from the position illustrated in FIG. 19 toward of the position illustrated in FIG. 20, the weight 41 remains in its inhibited rest position because the locking step 56 is located in the path of movement of the front edge 54'. The angle β between the locking step 56 and the sliding surface 55 may amount to approximately 120 degrees. If the lock is rotated beyond an angle, at which the locking step 56 lies in the horizontal (FIG. 20), e.g. as far as into the position illustrated in FIG. 21, the front edge 54' slides along the locking step 56 and subsequently along the inclined surface 57 until the weight 51 has reached its triggering position.

The inhibition elements and the locking elements assigned to the sidewall 41' act as a supplement to the locking body 66.

In the second exemplary embodiment illustrated in FIGS. 25 to 33, the storage element 20 is arranged so as to be displaceable between guide ribs 80, 81. The storage element 20 has a first projection that forms a supporting shoulder 73 and a second projection 69 that interacts with the pawl 11. The storage element 20 is acted upon from a rest position illustrated in FIG. 25 in the direction of the storage position illustrated in FIG. 28 by a storage element spring 26 that is realized in the form of a spiral coiled pressure spring. The storage element spring 26 is supported on an abutment 82 of the housing. The storage element 20 is realized in the form of a linearly displaceable slide in this case.

The housing 1 may consist of two housing shells or of a housing base body 1' with a housing cover 1". It is possible to provide another cover 1'" that also has an impact protection function. The housing 1 may be closed all around. Inner housing walls 76, 77 extend within the housing 1. The rotational axis 5 of the rotary latch 3 is located between two ends of the housing walls 76, 77. The rotary latch 3 has a hub that forms sealing surfaces 75' extending around the rotational axis 5 along a circular arc are line. Sealing elements 75 of an elastic material attached to the ends of the housing walls 76, 77 and form sealing surfaces that abut on the sealing surfaces 75' in a sealing manner. As a result, no moisture can be admitted into the interior of the housing. The sealing element 75 may abut on a ring 90 supporting the rotary latch 3 with sealing lips. The sealing lips may abut on diagonally opposed sealing surfaces 75' of the hub. A broadside surface of the rotary latch 3 may be supported on the ring 90. The opposite broadside surface of the rotary latch 3 may abut on a sealing ring 85. The sealing ring 85 can have diagonally opposed arms 85' that may lie between sealing lips of the sealing elements 75.

A pawl 11, which is mounted so as to be pivotable about a pivoting axis 13, is located in the interior of the housing 1 and acted upon into a locking position (see FIG. 27) by a pawl spring 15, wherein a locking shoulder 12 of the pawl 11 supports a supporting shoulder 7 of the rotary latch 3 in said locking position in order to thereby hold the rotary latch 3 in the closed position. The supporting shoulder 7 is formed by one end of a control arm 6 in this case.

A first arm of the pawl 11 is a tension arm, on which the pawl spring 15 engages. A second arm of the pawl 11 is a triggering arm 17, on which a trigger 32 can engage. The triggering arm 17 forms a recess 74 that has three walls. One wall of the recess 74 forms a shoulder 71, on which the storage element 20 can be supported in its rest position. The shoulder 71 may extend the rotational axis 13 along a circular arc line. Another wall of the recess 74 may form a stop 72, by means of which the pawl 11 can abut on the projection 69 in the locking position. A flank 70, by means of which the pawl 11 can be supported on the projection 69 in its release position and the storage position of the storage element 20, follows the recess 74 in the direction of the pivoting axis 13. The flank 70 may extend parallel to the wall 72 of the recess 74. However, the pawl 11 can also be supported on the triggering flank 33 with the triggering arm 17 in its locking position.

A triggering slide 35 is displaceably mounted in the housing 1. The triggering slide 35 can be displaced from the outer side of the housing in order to displace the pawl 11. To this end, the triggering slide 35 has a cam 78 that can move against a flank 79 of the pawl 11 in order to displace the pawl 11 from its locking position into the release position. The triggering slide 35 is displaced by means of an emergency opening button 87 that lies in a window 91 of the housing cover 1". Rear bevels 86 of the emergency opening button 87 may slide along on bevels 88 of the triggering slide 35 in order to displace the triggering slide 35 into the triggering position against the restoring force of a spring 89. The emergency opening button 87 can be acted upon by a spring element 94 that may be supported on the bottom of a pocket of the triggering slide 35.

A trigger 32 is mounted in the housing 1. The trigger 32 can be pivoted about a pivoting axis 83 by respectively rotating an opening element 37' or a cam 38. A triggering flank 33 of the trigger 32 then engages on the triggering arm 17 in order to displace the pawl 11 from its locking position into its release position. This is accompanied by a weight 41 arranged in the housing being displaced due to the fact that a pin 42 is supported on an outer edge 43' of an eye 43. The opening element 37' may be an eccentric that is actuated by a closing cylinder. In the exemplary embodiment, the opening element 37' has a square opening 92, into which a square projection 93 of a closing cylinder mounted in an opening in the wall of the rubbish bin can engage. The square projection 93 may have such a length that axial offsets caused by different material thicknesses of the container wall can be compensated.

However, the trigger 32 can also be pivoted by tilting the lock. In this case, the weight 41 is displaced within the housing, e.g. upward from the position illustrated in FIG. 26 into a position illustrated, for example, in FIG. 31, wherein the pin 42 does not rest on the lower edge 43' in this case, but rather on the upper edge 43". To this end, the weight is guided in a linear guide within a housing shell 1' formed by the lock body.

Figure 25:
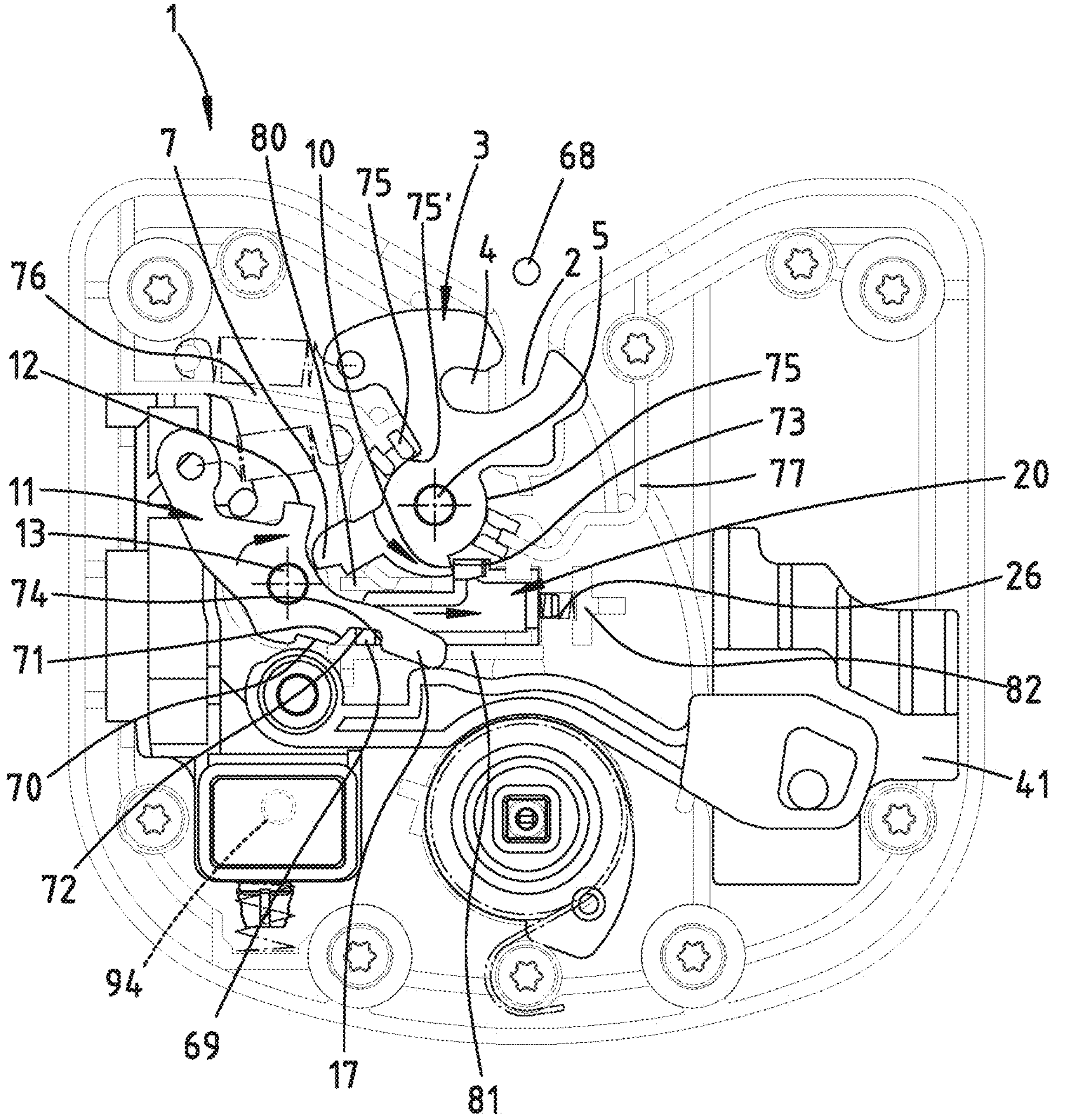
FIG. 25 shows a second exemplary embodiment of the invention in an open position of a rotary latch 3.

The lock functions as follows:

FIG. 25 shows an open position of the lock, in which the rotary latch 3 assumes its open position such that the forked mouth 4 is open toward the catcher 2 in order to capture a closing element 68. The pawl 11 is in its release position. It is supported on the projection 69 of the storage element 20 with the stop 72 in this case. The supporting shoulder 73 of the storage element 20 is supported on the control shoulder 10 of the rotary latch 3. The storage element 20 is thereby held in its raised position. The projection 69 may be slightly spaced apart from the shoulder 71. It lies in the recess 74.

When the closing element 68 is introduced into the catcher 2, it moves into the forked mouth 4 and acts upon one of the two fork tines. The rotary latch 3 is moved into the position illustrated in FIG. 26 in the direction of the arrow. In the process, the control shoulder 10 moves away from the supporting shoulder 73 such that the projection 69 can slightly migrate in the direction of the shoulder 71. When the rotary latch 3 rotates in the clockwise direction, the free end of the control arm 6 moves underneath a flank bordering on the locking shoulder 12, wherein this results in the pawl 11 being slightly displaced in the counterclockwise direction (see the arrow in FIG. 26), but not to such an extent that the projection 69 moves out of the recess 74.

Figure 26:
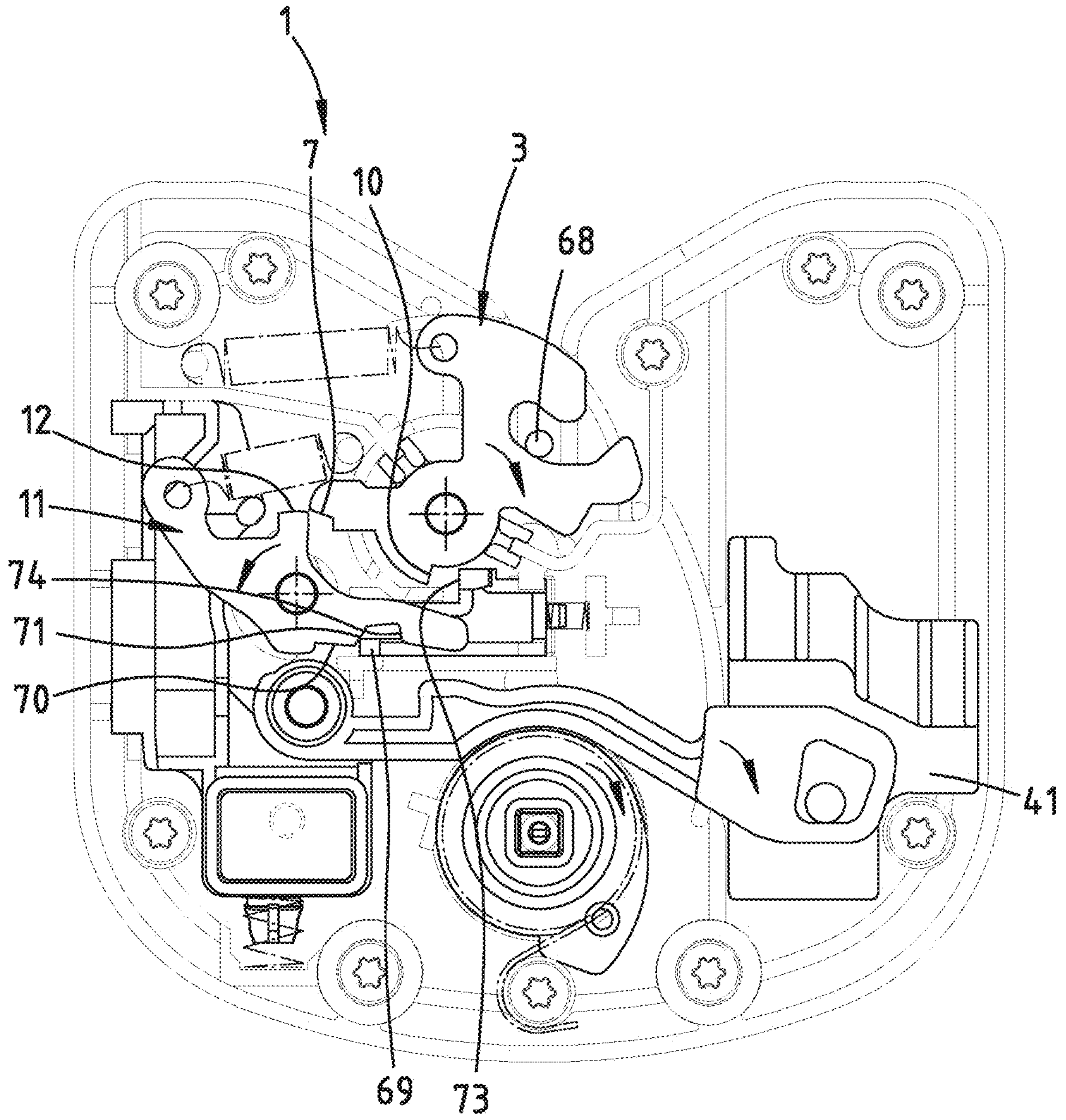
FIG. 26 shows the second exemplary embodiment after a displacement of the rotary latch 3 when a closing element 68 engages into the forked mouth 4 of the rotary latch 3
Figure 27:
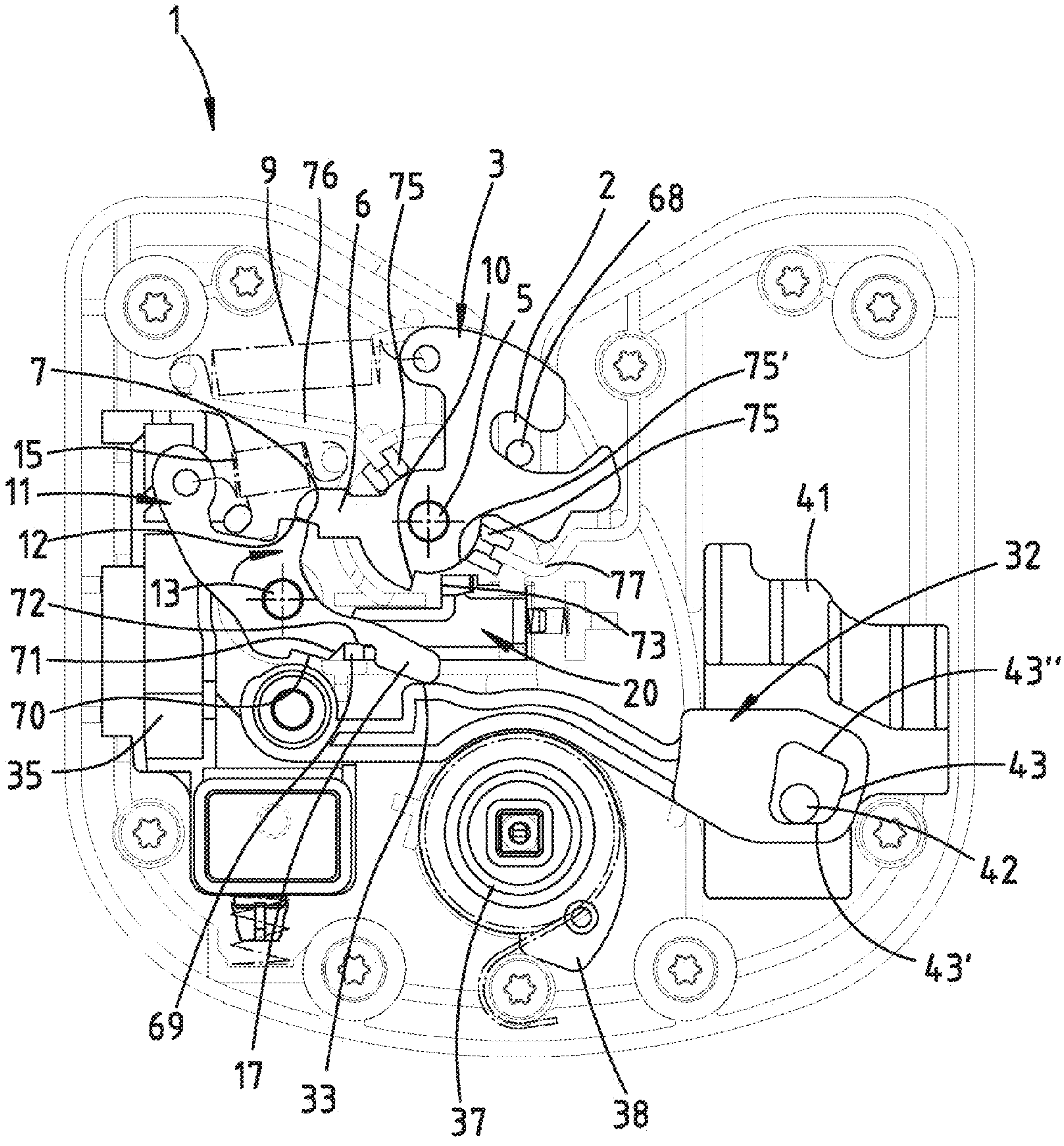
FIG. 27 shows the second exemplary embodiment immediately upon reaching the position illustrated in FIG. 26 after the pawl 11 has assumed its locking position.

After reaching the closed position of the rotary latch 3 illustrated in FIG. 26, the pawl 11 is pulled into the locking position, in which the locking shoulder 12 engages underneath the supporting shoulder 7, in the direction of the arrow illustrated in FIG. 27 or in the clockwise direction the by pawl spring 15. The projection 69 is supported on the shoulder 71 in this position.

There are different ways for moving the pawl 11 into a release position starting from the closed position of the rotary latch 3 illustrated in FIG. 27, in which the rotary latch 3 is blocked from being displaced into the open position by the pawl 11.

Figure 28:
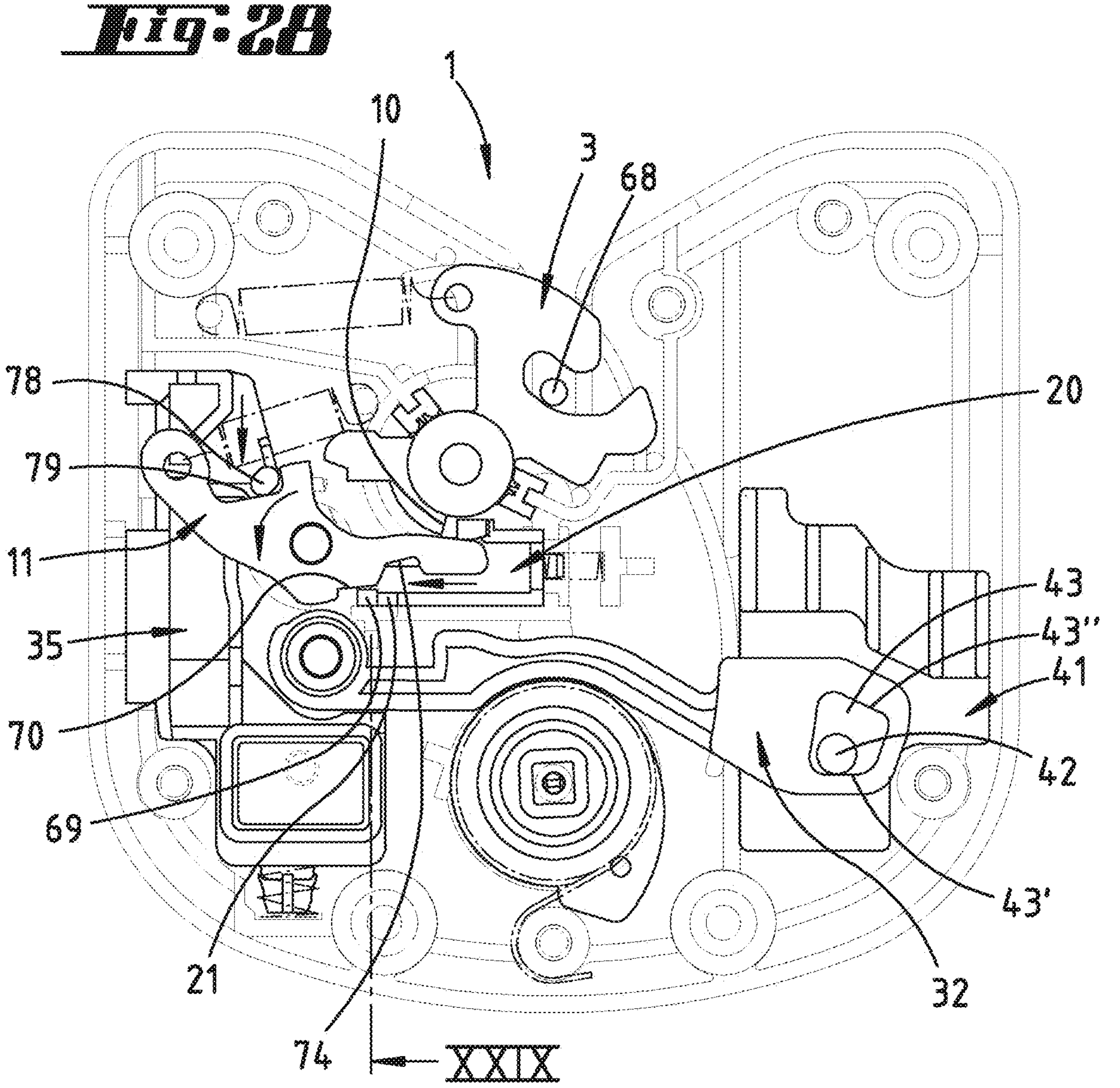
FIG. 28 shows the second exemplary embodiment after a displacement of a triggering slide 35 and a displacement of the pawl 11 into its release position.

FIG. 28 shows a first variation, in which the triggering slide 35 is displaced downward such that a cam 78 acts upon a flank 79 of the pawl 11. This is accompanied by a displacement of the pawl 11 in the counterclockwise direction. The projection 69 moves out of the recess 74 in that it slides along the flank 71. It moves underneath the flank 70, on which the pawl 11 can be supported, when the triggering slide 35 is moved upward into the operating position illustrated in FIG. 30.

Figure 29:
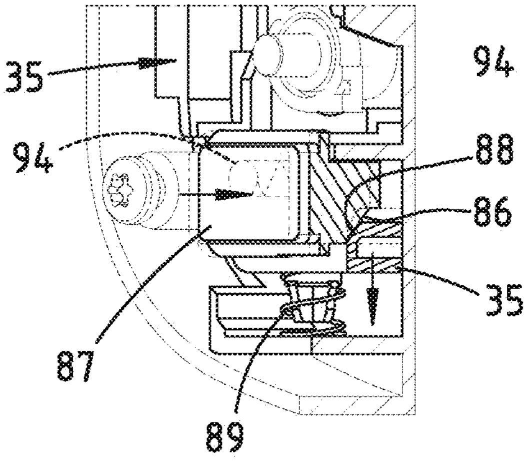
FIG. 29 shows the section along the line XXIX-XXIX in FIG. 28.

FIG. 29 shows that the emergency opening button 87 has rear bevels 88, which can slide along on inclined flanks 86 of the triggering slide 35 when the emergency opening button 87 is displaced by applying pressure thereto.

Due to the displacement of the pawl 11 into the position illustrated in FIG. 28, the projection 69 leaves the recess 74 and moves underneath the flank 70 of the pawl 11 in the direction of the pivoting axis 13 of the pawl 11.

Figure 30:
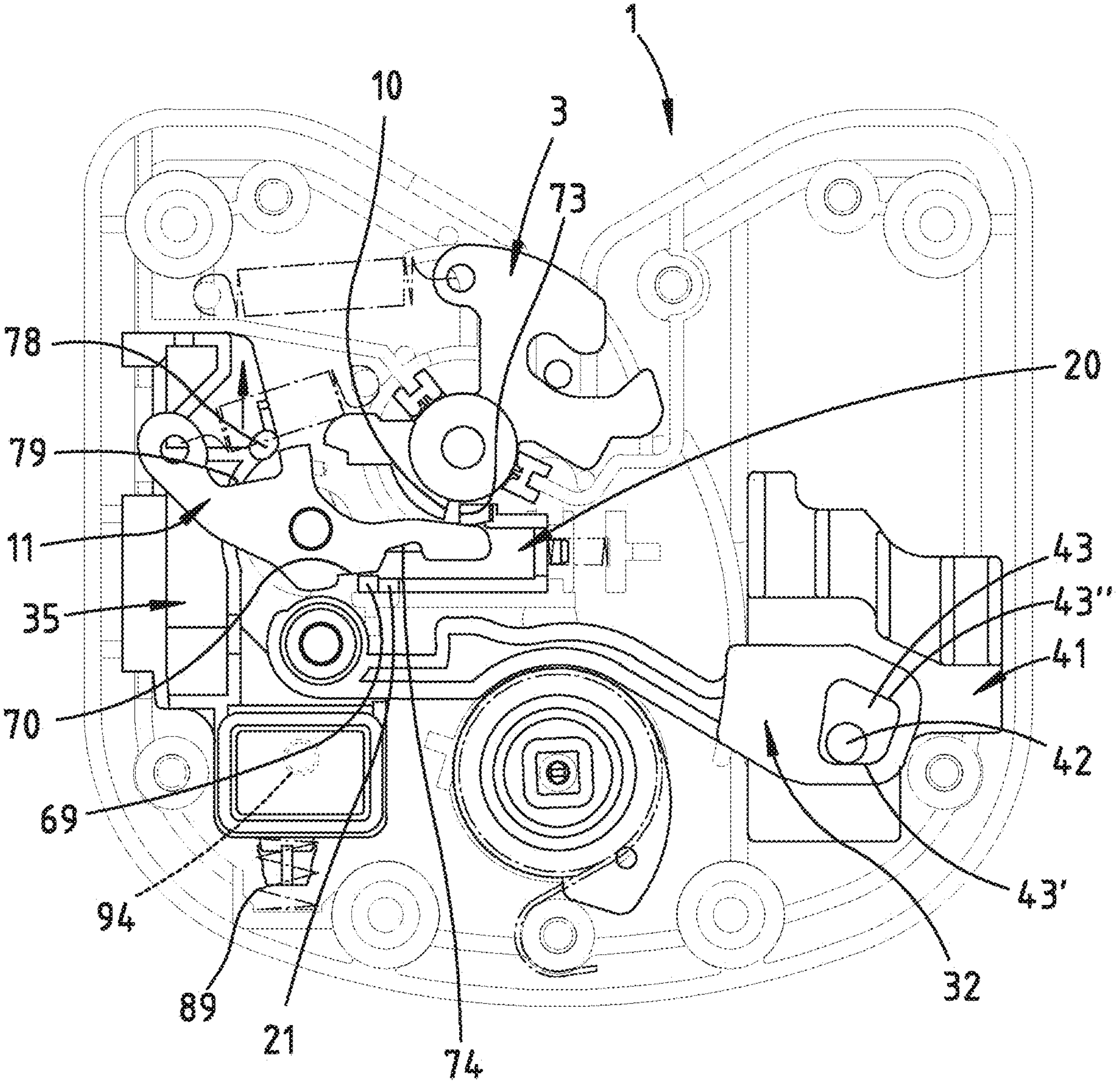
FIG. 30 shows the second exemplary embodiment after a backward displacement of the triggering slide 35.

FIG. 30 shows that, after the release of the emergency opening button 87, the triggering slide 35 is once again displaced upward by the spring 89 and the cam 78 leaves the flank 79. The pawl 11 remains s held in the storage position illustrated in FIG. 30.

Figure 31:
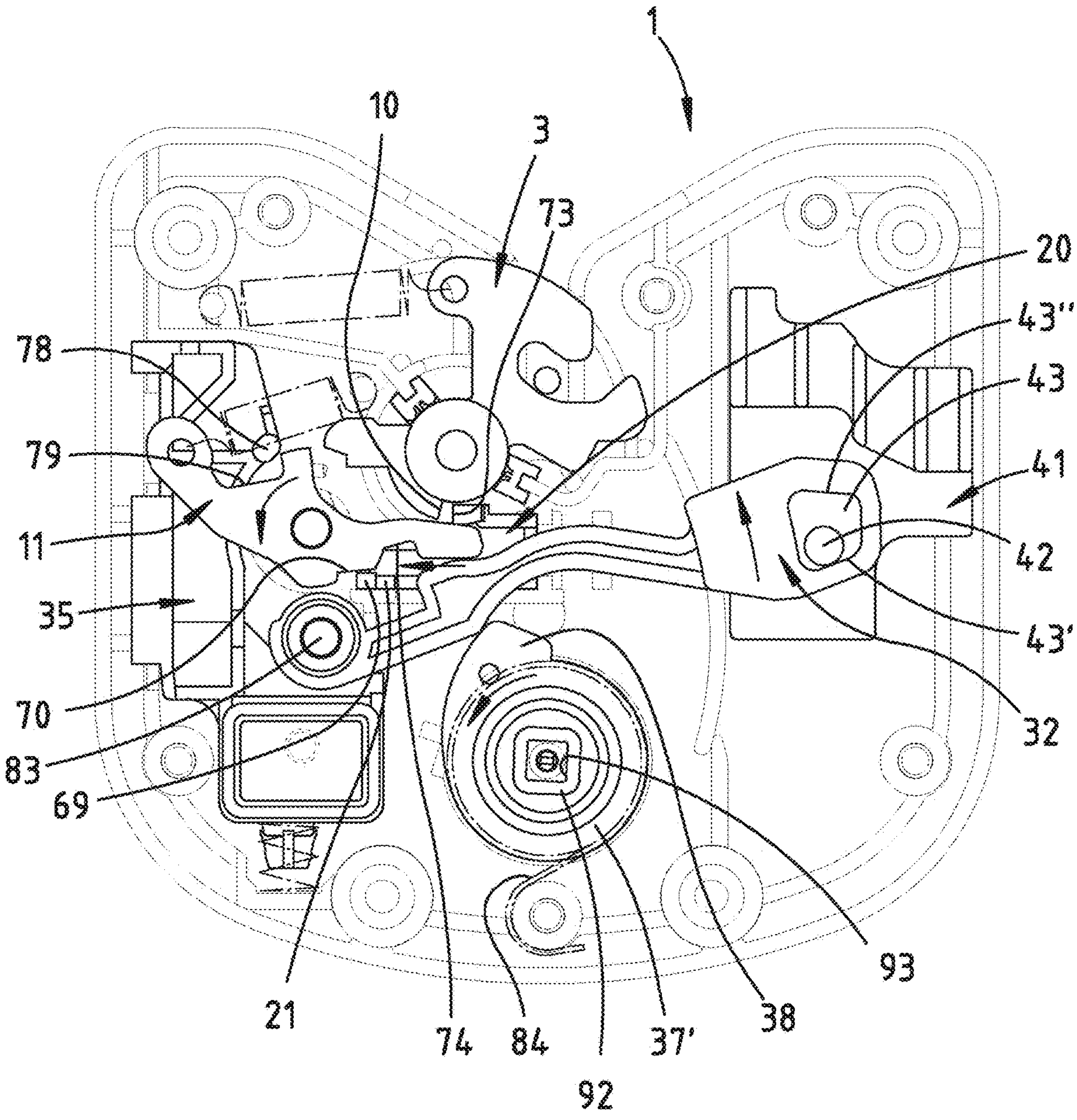
FIG. 31 shows the second exemplary embodiment after a displacement of a trigger 32.
Figure 32:
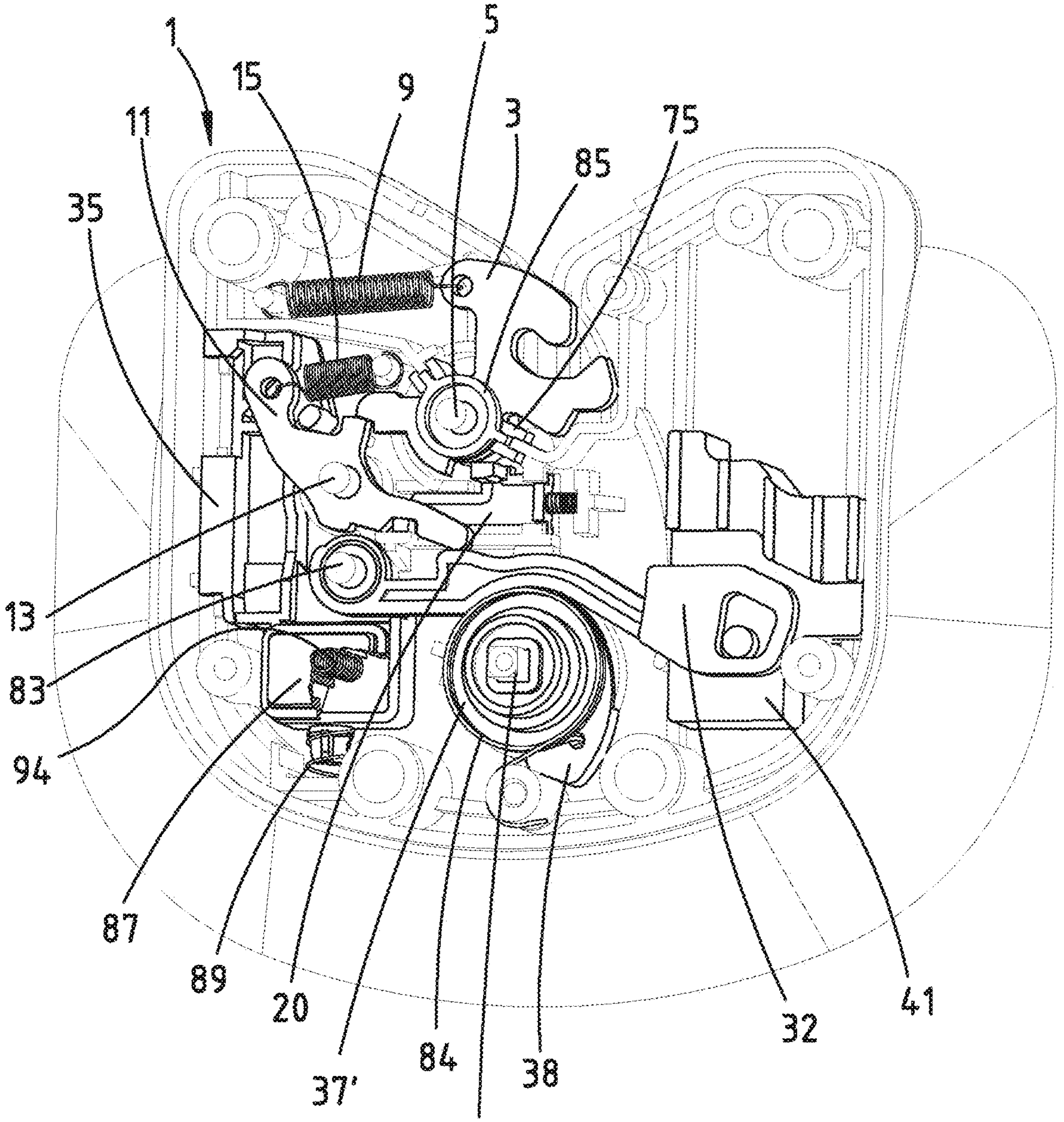
FIG. 32 shows a slightly perspective view of the second exemplary embodiment in an operating position according to FIG. 27.
Figure 33:
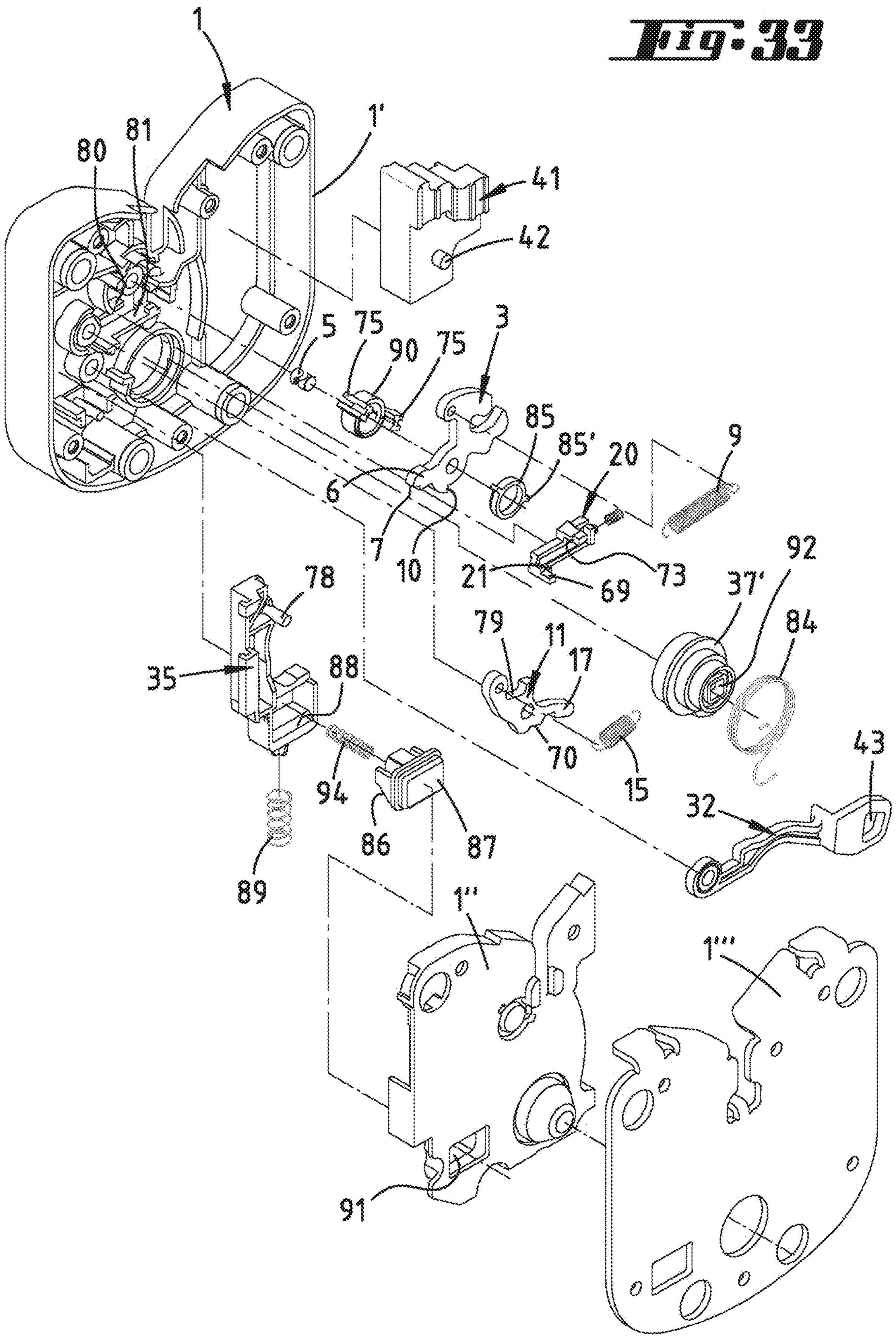
FIG. 33 shows an exploded view of the second exemplary embodiment.

The pawl 11 can also be moved into a release position starting from the closed position illustrated in FIG. 27 by displacing the trigger 32 (see FIG. 31). This can be realized, for example, by rotating the opening element 37' or a cam carrier 37 carrying a cam 38 in such a way that the trigger 32, which is realized in the form of a lever, is pivoted about its axis 83 as illustrated in FIG. 31. A triggering flank 33 acts upon the triggering arm 17 such that the pawl 11 is pivoted from its locking position into its release position in the counterclockwise direction. The projection 69 also leaves the recess 74 during this movement. A spring 84 may interact with the cam carrier 37, which may be realized in the form of a closing cylinder. The cam carrier 37 is rotatable against the restoring force of the spring 84 and carries the cam 38 that interacts with the trigger 32.

However, the trigger 32 can also be moved into the operating position illustrated in FIG. 31 in the above-described manner with the aid of the weight 41.

FIGS. 30 and 31 respectively show opening standby positions, in which the pawl 11 assumes its release position, but the rotary latch 3 is not yet displaced from the closed position into the open position. The flank 70 is supported on the projection 69. The pawl 11 only can leave its locking position once the rotary latch 3 is displaced into the open position illustrated in FIG. 25. The rotation of the rotary latch 3 from the closed position into the open position particularly is accompanied by the displacement of the storage element 20 from the storage position back into the rest position. In the process, the rotary latch 3 engages on the supporting shoulder 73 with the control shoulder 10 and displaces the storage element 20 against the restoring force of the storage element spring 26.

The preceding explanations serve for elucidating all inventions that are included in this application and respectively also enhance the prior art independently with at least the following combinations of characteristics, wherein two, multiple or all of these combinations of characteristics may also be combined with one another, namely:

A lock, which is characterized in that the storage element 20 is realized in the form of a slide or a pivoting element, which directly interacts with the pawl 11 in such a way that it is held in the rest position by the pawl 11 and holds the pawl 11 in the storage position.

A lock, which is characterized in that the storage element 20 has a projection 21, 69, which rests on a shoulder 12, 71 of the pawl 11 in the rest position and rests on a flank 14, 70 of the pawl 11 such that it prevents a displacement of the pawl 11 in the storage position.

A lock, which is characterized in that the rotary latch 3 forms a control shoulder 10, which engages on a supporting shoulder 21', 73 of the storage element 20 during the displacement of the rotary latch 3.

A lock, which is characterized in that the pawl 11 can be displaced from the locking position into the release position due to the displacement of a trigger 23 and/or a triggering slide 35 and/or a rotatable cam 38 and/or a weight 41 being displaced due to tilting of the lock.

A lock, which is characterized in that the pawl 11 can be displaced from the locking position into the release position due to the displacement of a trigger 23 and/or a triggering slide 35 and/or a rotatable cam 38 and/or a weight 41 being displaced due to tilting of the lock.

A lock, which is characterized in that the storage element 20 is displaced from the storage position into the rest position during a displacement of the rotary latch 3 from the open position into the closed position or during a displacement of the rotary latch 3 from the closed position into the open position.

A lock, which is characterized in that a locking shoulder 12 of the pawl 11 supports a supporting shoulder 7 of the rotary latch 3 in the locking position in such a way and the control shoulder 10 is spaced apart from the supporting shoulder 21', 73 in the closed position in such a way that, after the displacement of the pawl 11 into its release position, the storage element spring 26 displaces the storage element 20 from the rest position into the storage position without prior displacement of the rotary latch 3.

A lock, which is characterized in that the storage element 20 has a sliding or contact flank 23, which rests on a control flank 8 of the rotary latch 3 in the closed position and slides along the control flank 8 during its displacement from the closed position into the open position.

A lock, which is characterized in that the storage element 20 has a control flank 27' or a control arm 27 with a control flank 27', which is supported on a guide projection 30 of a housing 1, in which the pawl 11, the rotary latch 3, the trigger 32 and the storage element 20 are mounted, during the displacement of the storage element 20 from the storage position into the rest position.

A lock, which is characterized in that a supporting shoulder 21' of the projection 21 of the storage element 20 is in the rest position supported on a locking shoulder 12 of the pawl 11, which holds the rotary latch 3 in its closed position and forms a contact flank 21", on which a flank 14 of the pawl 11 is supported in the storage position and which is located adjacent to a supporting shoulder 22 that can rest on the locking shoulder 12 or a supporting element 46 of the housing in the storage position.

A lock, which is characterized in that the sliding flank 23 formed by the storage element 20 rests in the storage position on the control flank 8 of the rotary latch 3, which is in the closed position, and can be acted upon during the displacement of the rotary latch 3 from the closed position into the open position in such a way that the storage element 20 pivots.

A lock, which is characterized in that the control flank 27' being supported on the guide projection 30 causes a pivoting movement of the storage element 20 when the storage element 20 is displaced from the storage position back into the rest position by the control shoulder 10 of the rotary latch 3 by acting upon the supporting shoulder 21'.

A lock, which is characterized in that the shoulder 71 approximately extends around the pivoting axis 13 of the pawl 11 along an arcuate line and/or borders on the flank 70 such that an edge is formed and/or is a section of a wall of a recess 74, wherein the recess 74 forms a stop 72, by means of which the pawl 11 is supported on the projection 69 in the locking position.

A lock, which is characterized in that the shoulder 71 and/or the stop 72 and/or the shoulder 71 is formed by a triggering arm 17 of the pawl 11, on which a trigger 32 engages.

A lock, which is characterized in that the rotary latch 3 has a sealing surface 75' that extends around the rotational axis 5 of the rotary latch 3 along a circular arc line, wherein sealing elements 75 that are stationarily connected to inner housing walls 66, 77 abut on said sealing surface.

A lock, which is characterized in that the housing 1 has one or more locking elements 56, 60, 61, on which an inhibition element 54', 62 of the weight 41 is supported in such a way that it inhibits a displacement of the weight 1 into the triggering position in an intermediate position between the upright position and the inverted position.

A lock, which is characterized in that the inhibition element 54', 62 moves against the locking element 56, 60, 61 due to a tilting movement of the weight 1, which is caused by an angular momentum or by gravity.

A lock, which is characterized in that the inhibition element is a front edge 54' of an extension 54 of the weight 1, which is realized in the form of a slide that can be displaced on a sliding surface 55, wherein said front edge moves against a locking step 56 bordering on the sliding surface 55 after a tilting movement of the weight 1 about the tilting axis 67, and wherein the locking step 56 particularly borders on the sliding surface 55 such that an angle β greater than 120 degrees is formed.

A lock, which is characterized in that the locking step 56 is followed by an inclined surface 57, along which the front edge 54' slides once it leaves the locking step 56 after reaching the intermediate position.

A lock, which is characterized in that the inhibition element is an inhibition flank, particularly a step or recess 62 of a sidewall 41' of the weight 41, which moves against a locking flank, particularly a locking lug 60, 61 of the housing 1, after a tilting movement of the weight 1 about a tilting support 64 of the housing 1, wherein the inhibition flank and/or the locking flank particularly is inclined or extends in a rounded manner.

A lock, which is characterized in that the tilting movement takes place about a tilting axis 67, on which two surfaces 58, 59 of the weight 41 border on one another.

A use of a lock according to one of the preceding claims on a rubbish bin having a container and an openable lid that closes the container, wherein the lock is fastened on a wall of the container and a closing element 68 is fastened on the lid and lies in the forked mouth 4 of the rotary latch 3 in the closed position of the lid.

A use, which is characterized in that the pawl 11 can be moved from its locking position into its release position without rotating the rotary latch 3 by actuating a trigger 32 and in the process releases the displacement of the storage element 20 from its rest position into its storage position, in which the storage element 20 holds the pawl 11 in the release position without the cooperation of the trigger 32 until the storage element is displaced back into the rest position due to a rotation of the rotary latch 3.

All disclosed characteristics are essential to the invention (individually, but also in combination with one another). The disclosure of the associated/attached priority documents (copy of the priority application) is hereby fully incorporated into the disclosure content of this application, namely also for the purpose of integrating characteristics of these documents into claims of the present application. The characteristics of the dependent claims also characterize independent inventive enhancements of the prior art without the characteristics of a claim to which they refer, particularly for submitting divisional applications on the basis of these claims. The invention specified in each claim may additionally comprise one or more of the characteristics that were disclosed in the preceding and, description in particular, are identified by reference symbols and/or included in the list of reference symbols. The invention also concerns design variations, in which individual characteristics cited in the preceding description are not realized, particularly as far as they are obviously dispensable for the respective intended use or can be replaced with other, identically acting technical means.

LIST OF REFERENCE SYMBOLS

1 Lock housing
1' Housing shell, housing base body
1" Housing cover
1'" Cover
2 Catcher
3 Rotary latch
4 Forked mouth 5 Rotational axis
6 Control arm
7 Supporting shoulder
8 Control flank
9 Rotary latch spring
10 Control shoulder
11 Pawl
12 Locking shoulder
13 Pivoting axis
14 Flank
15 Pawl spring
16 Locking arm
17 Triggering arm
18 Triggering flank
19 Triggering flank
20 Storage element
21 Projection
21' Supporting shoulder
21" Contact flank
22 Supporting shoulder
23 Sliding contact surface
24 Bevel
25 Taper
26 Storage element spring
27 Control arm
27' Control flank
28 Guide groove
29 Guide rib
29' Section
29" Section
30 Guide projection
31 Wall section
32 Trigger
33 Triggering flank
34 Bevel
35 Triggering slide
36 Bevel
37 Closing cylinder
37' Opening element
38 Cam, cam carrier
39 Triggering lever
40 Projection
41 Weight
41' Sidewall
42 Pin
43 Eye
43' Edge
43" Edge
44 Guide
45 Supporting element
46 Supporting element, rib
47 Eye
48 Guide section
49 Control section
50 Rear wall
51 Opening
52 Recessed grip
53 Wing
54 Extension
54' Front edge
55 Sliding surface
56 Locking step
57 Inclined surface
58 Surface
59 Surface
60 Locking lug
61 Locking lug 62 Locking lug
63 Tilting support
64 Tilting support
65 Bearing recess
66 Locking body
67 Tilting axis
68 Closing element
69 Projection
70 Flank
71 Shoulder
72 Stop
73 Supporting shoulder
74 Recess
75 Sealing element
75' Sealing surface
76 Housing wall
77 Housing wall
78 Cam
79 Flank
80 Guide rib
81 Guide rib
82 Abutment
83 Pivoting axis
84 Spring
85 Sealing ring
85' Arm
86 Bevel
87 Emergency opening button
88 Bevel
89 Spring
90 Ring
91 Window
92 Square opening
93 Square projection
94 Spring
β Angle

The invention claimed is:

1. A lock, comprising:

a rotary latch (3) that is configured to be displaced between an open position and a closed position, a pawl (11) that is configured to be displaced between a locking position and a release position, and a storage element (20) that is configured to be displaced between a rest position and a storage position and is acted upon in a direction of the storage position by a storage element spring (26), wherein the pawl (11) in the locking position holds the rotary latch (3) in the closed position, wherein a displacement of the pawl (11) from the locking position into the release position releases the rotary latch (3) for a displacement into the open position and leads to a displacement of the storage element (20) from the rest position into the storage position, wherein in the storage position, the storage element (20) prevents a displacement of the pawl (11) back into the locking position and is displaced from the storage position into the rest position against a restoring force of the storage element spring (26) during a displacement of the rotary latch (3), and wherein the storage element (20) is a slide or a pivoting element, which directly interacts with the pawl (11) so that the storage element is held in the rest position by the pawl (11) and holds the pawl (11) in the storage position.

2. The lock according to claim 1, wherein the storage element (20) has a projection (21, 69), which rests on a shoulder (12, 71) of the pawl (11) in the rest position and rests on a flank (14, 70) of the pawl (11) such that the storage element prevents a displacement of the pawl (11) in the storage position.

3. The lock according to claim 1, wherein the rotary latch (3) forms a control shoulder (10), which engages on a supporting shoulder (21', 73) of the storage element (20) during the displacement of the rotary latch (3).

4. The lock according to claim 1, wherein the storage element (20) is a slide that is guided in a guide (28, 29).

5. The lock according to claim 1, wherein the pawl (11) is configured to be displaced from the locking position into the release position due to displacement of a trigger (23) and/or a triggering slide (35) and/or a rotatable cam (38) and/or a weight (41) being displaced when the lock is tilted.

6. The lock according to claim 1, wherein the storage element (20) is displaced from the storage position into the rest position during a displacement of the rotary latch (3) from the open position into the closed position or during a displacement of the rotary latch (3) from the closed position into the open position.

7. The lock according to claim 3, wherein a locking shoulder (12) of the pawl (11) supports a supporting shoulder (7) of the rotary latch (3) in the locking position in such a way and the control shoulder (10) is spaced apart from the supporting shoulder (21', 73) in the closed position in such a way that, after the displacement of the pawl (11) into the release position, the storage element spring (26) displaces the storage element (20) from the rest position into the storage position without prior displacement of the rotary latch (3).

8. The lock according to claim 1, wherein the storage element (20) has a control flank (27') or a control arm (27) with a control flank (27'), which is supported on a guide projection (30) of a housing (1), in which the pawl (11), the rotary latch (3), the trigger (32) and the storage element (20) are mounted, during the displacement of the storage element (20) from the storage position into the rest position.

9. The lock according to claim 7, wherein the storage element (30) has a supporting shoulder (21') with a projection (21), wherein in the rest position of the storage element (20), the projection is supported on a locking shoulder (12) of the pawl (11), which holds the rotary latch (3) in the closed position and forms a contact flank (21"), on which a flank (14) of the pawl (11) is supported in the storage position and which is located adjacent to a supporting shoulder (22) that can rest on the locking shoulder (12) or a supporting element (46) of a housing in the storage position.

10. The lock according to claim 8, wherein the control flank (27') being supported on the guide projection (30) causes a pivoting movement of the storage element (20) when the storage element (20) is displaced from the storage position back into the rest position by the control shoulder (10) of the rotary latch (3) by acting upon a supporting shoulder (21') of the storage element (30).

11. The lock according to claim 2, wherein the shoulder (71) approximately extends around the pivoting axis (13) of the pawl (11) along an arcuate line and/or borders on the flank (70) such that an edge is formed and/or is a section of a wall of a recess (74), wherein the recess (74) forms a stop (72), by means of which the pawl (11) is supported on the projection (69) in the locking position.

12. The lock according to claim 11, wherein the shoulder (71) and/or the stop (72) and/or the shoulder (71) is formed by a triggering arm (17) of the pawl (11), on which a trigger (32) engages.

13. The lock according to claim 1, wherein the rotary latch (3) has a sealing surface (75') that extends around a rotational axis (5) of the rotary latch (3) along a circular arc line, wherein sealing elements (75) that are stationarily connected to inner housing walls (66, 77) abut on said sealing surface.

14. A lock, comprising:

a rotary latch (3) that is configured to be displaced between an open position and a closed position, a pawl (11) that is configured to be displaced between a locking position and a release position, and a storage element (20) that is configured to be displaced between a rest position and a storage position and is acted upon in the direction of the storage position by a storage element spring (26), wherein the pawl (11) in the locking position holds the rotary latch (3) in the closed position, wherein a displacement of the pawl (11) from the locking position into the release position releases the rotary latch (3) for a displacement into the open position and leads to a displacement of the storage element (20) from the rest position into the storage position, wherein in the storage position, the storage element (20) prevents a displacement of the pawl (11) back into the locking position and is displaced from the storage position into the rest position against the restoring force of the storage element spring (26) during a displacement of the rotary latch (3), and wherein the storage element (20) has a sliding or contact flank (23), which rests on a control flank (8) of the rotary latch (3) in the closed position and slides along the control flank (8) during displacement from the closed position into the open position.

15. The lock according to claim 14, wherein the sliding or contact flank (23) formed by the storage element (20) rests in the storage position on the control flank (8) of the rotary latch (3), which is in the closed position, and is configured to be acted upon during the displacement of the rotary latch (3) from the closed position into the open position in such a way that the storage element (20) pivots.

16. A lock, comprising:

a latch (3) that is arranged in a housing (1) and held in a closed position in an upright position of the lock, and a weight (41) that is arranged in the housing (1) and, during a displacement of the lock from the upright position into an inverted position about a tilting axis, is displaced from a rest position into a triggering position along a sliding surface (55) and in the process releases the latch (3) for a displacement from the closed position into an open position, wherein the housing (1) has one or more locking elements (56, 60, 61), on which an inhibition element (54', 62) of the weight (41) is supported in such a way that the inhibition element inhibits a displacement of the weight (1) into the triggering position in an intermediate position between the upright position and the inverted position.

17. The lock according to claim 16, wherein the inhibition element (54', 62) moves against the locking element (56, 60, 61) due to a tilting movement of the weight (1), which is caused by an angular momentum or by gravity.

18. The lock according to claim 16, wherein the inhibition element is a front edge (54') of an extension (54) of the weight (1), which is realized in the form of a slide that can be displaced on a sliding surface (55), wherein said front edge moves against a locking step (56) bordering on the sliding surface (55) after a tilting movement of the weight (1) about the tilting axis (67), and wherein the locking step (56) borders on the sliding surface (55) such that an angle (B) greater than 120 degrees is formed.

19. The lock according to claim 18, wherein the locking step (56) is followed by an inclined surface (57), along which the front edge (54') slides once the front edge leaves the locking step (56) after reaching the intermediate position.

20. The lock according to claim 16, wherein the inhibition element is an inhibition flank, in the form of a step or recess (62) of a sidewall (41') of the weight (41), which moves against a locking flank, in the form of a locking lug (60, 61) of the housing (1), after a tilting movement of the weight (1) about a tilting support (64) of the housing (1), wherein the inhibition flank and/or the locking flank is inclined or extends in a rounded manner.

* * * * *